United States Patent
Ma et al.

(10) Patent No.: US 12,345,900 B2
(45) Date of Patent: Jul. 1, 2025

(54) TIME-MULTIPLEXED MULTIVIEW BACKLIGHT, MULTIVIEW DISPLAY AND METHOD

(71) Applicant: LEIA Inc., Menlo Park, CA (US)

(72) Inventors: Ming Ma, Menlo Park, CA (US); David A. Fattal, Mountain View, CA (US)

(73) Assignee: LEIA Inc., Menlo Park, CA (US)

( * ) Notice: Subject to any disclaimer, the term of this patent is extended or adjusted under 35 U.S.C. 154(b) by 0 days.

(21) Appl. No.: 18/713,379

(22) PCT Filed: Dec. 7, 2021

(86) PCT No.: PCT/US2021/062274
§ 371 (c)(1),
(2) Date: May 24, 2024

(87) PCT Pub. No.: WO2023/107103
PCT Pub. Date: Jun. 15, 2023

(65) Prior Publication Data
US 2025/0013070 A1 Jan. 9, 2025

(51) Int. Cl.
*F21V 8/00* (2006.01)
*G02B 30/33* (2020.01)

(52) U.S. Cl.
CPC ............. *G02B 30/33* (2020.01); *G02B 6/005* (2013.01)

(58) Field of Classification Search
CPC ................................ G02B 30/33; G02B 6/005
See application file for complete search history.

(56) References Cited

U.S. PATENT DOCUMENTS 9,019,240 B2  4/2015  Gruhlke et al.
9,128,226 B2  9/2015  Fattal et al.
(Continued)

FOREIGN PATENT DOCUMENTS

CA   3217183 A1   11/2022
CN   117255914 A  12/2023
(Continued)

OTHER PUBLICATIONS

"Canadian Application Serial No. 3,217,183, Voluntary Amendment filed Oct. 18, 2023", 45 pgs.
(Continued)

*Primary Examiner* — Donald L Raleigh
(74) *Attorney, Agent, or Firm* — Schwegman, Lundberg & Woessner, P.A.

(57) ABSTRACT

A time-multiplexed multiview backlight, display, and method of time-multiplexed multiview backlight operation provide one or both of enhanced spatial resolution and enhanced angular resolution using time-multiplexing. The time-multiplexed multiview backlight includes a light guide configured to guide light as time-multiplexed guided light having different directions during different time intervals and an array of multibeam elements configured to scatter the time-multiplexed guided light as directional light beams. A first set of multibeam elements is configured to selectively scatter out the time-multiplexed guided light having the first direction and a second set of multibeam elements of the multibeam element array is configured to selectively scatter out the time-multiplexed guided light having the second direction. The time-multiplexed multiview display further includes an array of light valves configured to modulate the directional light beams as view pixels of a multiview image having different views in the different view directions.

17 Claims, 6 Drawing Sheets

(56) References Cited

U.S. PATENT DOCUMENTS

| | | | |
|---|---|---|---|
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,785,119 | B2 | 10/2017 | Taff et al. |
| 10,345,505 | B2 | 7/2019 | Fattal |
| 10,649,128 | B2 | 5/2020 | Fattal et al. |
| 10,798,371 | B2 | 10/2020 | Fattal |
| 10,802,443 | B2 | 10/2020 | Fattal |
| 10,830,939 | B2 | 11/2020 | Fattal et al. |
| 10,838,134 | B2 | 11/2020 | Fattal et al. |
| 10,884,175 | B2 | 1/2021 | Fattal |
| 10,928,677 | B2 | 2/2021 | Aieta et al. |
| 10,948,647 | B2 | 3/2021 | Fattal |
| 10,969,531 | B2 | 4/2021 | Fattal et al. |
| 11,016,235 | B2 | 5/2021 | Fattal et al. |
| 11,143,810 | B2 | 10/2021 | Fattal et al. |
| 11,143,811 | B2 | 10/2021 | Fattal et al. |
| 11,256,022 | B2 | 2/2022 | Aieta et al. |
| 11,320,578 | B2 | 5/2022 | Fattal et al. |
| 11,347,053 | B2 | 5/2022 | Fattal |
| 11,635,619 | B2 | 4/2023 | Fattal |
| 2008/0043490 | A1 | 2/2008 | Coleman et al. |
| 2008/0225393 | A1 | 9/2008 | Rinko |
| 2009/0322986 | A1 | 12/2009 | Wei et al. |
| 2012/0200807 | A1 | 8/2012 | Wei et al. |
| 2013/0169518 | A1 | 7/2013 | Wu et al. |
| 2014/0036176 | A1 | 2/2014 | Shinkai et al. |
| 2017/0363794 | A1 | 12/2017 | Wan et al. |
| 2018/0188440 | A1* | 7/2018 | Fattal .................. G02B 6/0068 |
| 2018/0210130 | A1 | 7/2018 | Lee et al. |
| 2020/0018886 | A1* | 1/2020 | Fattal .................. G02B 6/0055 |
| 2020/0117053 | A1* | 4/2020 | Fattal ................ G02F 1/133615 |
| 2020/0310135 | A1* | 10/2020 | Fattal .................. G02B 27/106 |
| 2020/0319513 | A1 | 10/2020 | Fattal et al. |
| 2021/0208328 | A1 | 7/2021 | Fattal |
| 2021/0250572 | A1 | 8/2021 | Fattal |
| 2022/0050243 | A1 | 2/2022 | Fattal |
| 2022/0113554 | A1 | 4/2022 | Fattal et al. |
| 2022/0171118 | A1 | 6/2022 | Fattal et al. |
| 2022/0191462 | A1 | 6/2022 | Fattal et al. |
| 2022/0350071 | A1 | 11/2022 | Fattal et al. |
| 2022/0357500 | A1 | 11/2022 | Fattal et al. |
| 2024/0027673 | A1 | 1/2024 | Fattal et al. |

FOREIGN PATENT DOCUMENTS

| | | |
|---|---|---|
| CN | 118541629 | 8/2024 |
| EP | 4334639 | 3/2024 |
| JP | 2006350338 A | 12/2006 |
| JP | 2012252993 A | 12/2012 |
| JP | 2024519217 A | 5/2024 |
| KR | 20170056784 A | 5/2017 |
| KR | 20230159539 A | 11/2023 |
| TW | 201736916 A | 10/2017 |
| TW | 201915560 A | 4/2019 |
| TW | 202014761 A | 4/2020 |
| TW | 202026702 | 7/2020 |
| TW | 202101089 A | 1/2021 |
| TW | 202307525 | 2/2023 |
| TW | 202336514 A | 9/2023 |
| TW | I864483 | 12/2024 |
| WO | 2012038856 | 3/2012 |
| WO | 2013180725 | 12/2013 |
| WO | 2016106987 | 7/2016 |
| WO | 2018067381 | 4/2018 |
| WO | 2018140063 | 8/2018 |
| WO | WO-2020219400 A1 | 10/2020 |
| WO | WO-2021086387 A1 | 5/2021 |
| WO | WO-2022235277 A1 | 11/2022 |
| WO | WO-2023107103 A1 | 6/2023 |

OTHER PUBLICATIONS

"International Application Serial No. PCT/US2021/031433, International Preliminary Report on Patentability mailed Nov. 16, 2023", 6 pgs.

"International Application Serial No. PCT/US2021/031433, International Search Report mailed Feb. 4, 2022", 3 pgs.

"International Application Serial No. PCT/US2021/031433, Written Opinion mailed Feb. 4, 2022", 4 pgs.

"International Application Serial No. PCT/US2021/062274, International Search Report mailed Aug. 30, 2022", 3 pgs.

"International Application Serial No. PCT/US2021/062274, Written Opinion mailed Aug. 30, 2022", 4 pgs.

"Taiwanese Application Serial No. 111142986, Office Action mailed Mar. 29, 2024", w/ English translation, 14 pgs.

"Taiwanese Application Serial No. 111142986, Request for Reexamination filed May 31, 2024", w English Claims, 25 pgs.

"Japanese Application Serial No. 2023-568268, Voluntary Amendment Filed Feb. 5, 2024", w English Claims, 11 pgs.

"International Application Serial No. PCT US2021 062274, International Preliminary Report on Patentability mailed Jun. 20, 2024", 6 pgs.

"European Serial Application No. 21939955.7, Response to Communication pursuant to Rules 161(1) and 162 EPC Filed Jun. 3, 2024", 23 pgs.

"Taiwanese Application Serial No. 111116479, Office Action mailed Jan. 5, 2023", w English translation, 17 pgs.

"Taiwanese Application Serial No. 111116479, Response filed Apr. 7, 2023 to Office Action mailed Jan. 5, 2023", w English claims, 19 pgs.

"Taiwanese Application Serial No. 111116479, Decision of Rejection mailed Aug. 15, 2023", w English translation, 9 pgs.

"Taiwanese Application Serial No. 111116479, Request Examination filed Oct. 16, 2023", w English translation, 47 pgs.

"Taiwanese Application Serial No. 111142986, Office Action mailed Nov. 29, 2023", W English Translation, 20 pgs.

Fattal, David, "A multi-directional backlight for a wide-angle, glasses-free three-dimensional display", Nature, vol. 495, Macmillan Publishers Limited, (Mar. 20, 2013), 348-351.

Kee, Edwin, "Hitachi Full Parallax 3D Display Offers Mind Bending Visuals", [Online] Retrieved from the internet:http: www.ubergizmo.com 2011 10 hitachi-full-parallax-3d-display-offers-mind-bending-visuals, (Oct. 4, 2011).

Son, Jung-Young, "Three-Dimensional Imaging Methods Based on Multiview Images", IEEE OSA Journal of Display Technology, vol. 1, No. 1 pp. 125-140, (Sep. 2005), 16 pgs.

Stephan, Reichelt, "Holographic 3-D Displays- Electro-holography within the Grasp of Commercialization", Advances n Lasers and Electro-Optics, Optics, Nelson Costa and Adolfo Cartaxo (Ed.), [Online]. Retrieved from the Internet: http: www.intechopen.com books advances-in-lasers-and-electro-{}ptics Holographic-3-ddisplays-electro-holography-within-the-grasp-{}f-commercialization., (2010), 683-711.

Travis, Adrian, "Collimated light from a waveguide for a display backlight", Optics Express, vol. 17, No. 22, (Oct. 2009), 19714-19719.

Xu, Xuewu, "Computer-Generated Holography for Dynamic Display of 3D Objects with Full Parallax", The International Journal of Virtual Reality, 8(2), (2009), 33-38.

"U.S. Appl. No. 18/479,101, Non Final Office Action mailed Jan. 28, 2025", 13 pgs.

"Canadian Application Serial No. 3,217,183, Examiners Rule 86(2) Report mailed Mar. 21, 2025", 5 pgs.

* cited by examiner

TIME-MULTIPLEXED MULTIVIEW BACKLIGHT, MULTIVIEW DISPLAY AND METHOD

CROSS-REFERENCE TO RELATED APPLICATIONS

This application is a U.S. National Stage Filing under 35 U.S.C. 371 from International Application No. PCT/US2021/062274, filed on Dec. 7, 2021, and published as WO 2023/107103, which application is incorporated herein by reference in its entirety

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
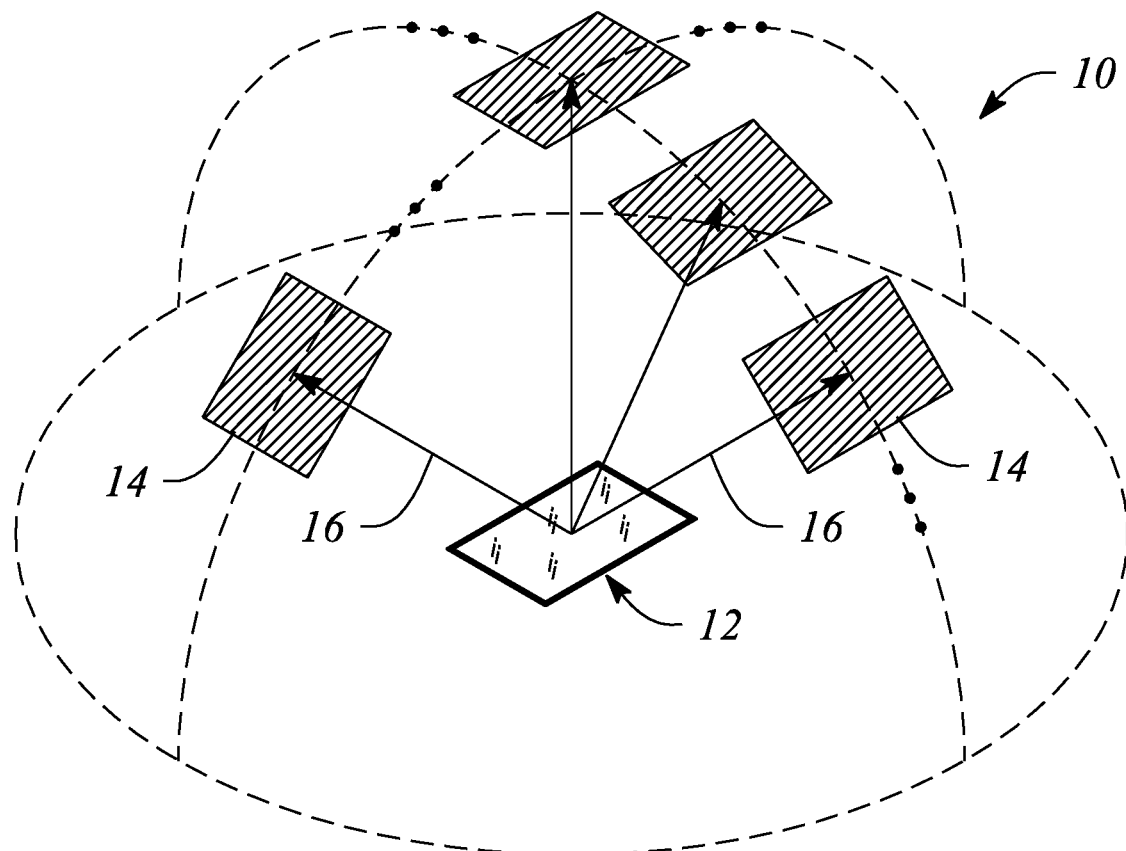
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a multiview or three-dimensional (3D) display and a multiview backlight with application to the multiview display. In particular, embodiments consistent with the principles described herein provide a multiview backlight employing an array of multibeam elements configured to provide directional light beams having a plurality of different principal angular directions corresponding to view directions of a multiview display. According to various embodiments, each multibeam element of the multibeam element array may include one or more scattering elements configured to selectively scatter guided light out of a light guide as the directional light beams depending on a propagation direction of the guided light. Using time-multiplexing of light propagating in different directions within the light guide in conjunction with the scattering selectivity of the scattering elements of the multibeam elements may provide either an enhanced spatial resolution or an enhanced an angular resolution of the multiview backlight or equivalently of the multiview display that employs the multiview backlight, according to various embodiments.

According to various embodiments, the multibeam elements are sized relative to sub-pixels of a multiview pixel or equivalently of light valves of sets of light valves in a multiview display. The multibeam elements may also be spaced apart from one another in a manner corresponding to a spacing of multiview pixels or light valve sets in the multiview display. According to various embodiments, the different principal angular directions of the light beams provided by the multibeam elements of the multiview backlight correspond to different directions of various different views, or 'view directions,' of the multiview display. Uses of multiview backlights and multiview displays described herein include, but are not limited to, mobile telephones (e.g., smart phones), watches, tablet computes, mobile computers (e.g., laptop computers), personal computers and computer monitors, automobile display consoles, camera displays, and various other mobile as well as substantially non-mobile display applications and devices.

As mentioned above, embodiments described herein employing time-multiplexing may provide enhanced or increased spatial resolution of a multiview display or equivalently of a multiview image displayed by the multiview display, when compared to a native resolution of the multiview display. Herein, "spatial resolution" is defined as a pixel resolution of a particular image that comprises a portion, or view, of a multiview image. The spatial resolution may be expressed in pixels (e.g., view pixels) per inch or pixels per view image, for example. According to various embodiments, interlaced view pixels provided by time-multiplexing and selective scattering may provide the enhanced spatial resolution of a multiview image.

Also as mentioned above, embodiments described herein may provide enhanced or increased angular resolution of the multiview display or equivalently of a multiview image displayed by the multiview display, when compared to a native resolution of the multiview display. Generally, "angular resolution" refers to a number of different views of a multiview image in an angular region or space (e.g., a half-space above a display surface). The angular resolution may be expressed in terms of either a number of views per angular zone or a total number of unique views provided by the multiview display. Time-multiplexing in conjunction with selective scattering may provide interlaced views to enhance or increase the angular resolution of a multiview image, according to various embodiments.

Embodiments in accordance with the principles described herein provide time-multiplexed multiview backlighting and may also provide mode-switching backlighting with application to a time-multiplexed multiview display as well as methods of operation thereof. In particular, a time-multiplexed multiview backlight can optionally provide broad-angle emitted light during a two-dimensional (2D) mode and directional emitted light comprising directional light beams during a multiview mode. The broad-angle emitted light may support display of two-dimensional (2D) information (e.g., a 2D image or text), while the directional light beams of the directional emitted light may support display of multiview or three-dimensional (3D) information (e.g., a multiview image), for example. Further, in various embodiments, the 2D mode and the multiview mode of the time-multiplexed multiview backlight may also be time-multiplexed or time-interlaced to provide the broad-angle emitted light in a first time interval and the directional emitted light in a second time interval, respectively. According to the time multiplexing or time-interlacing, a time-multiplexed multiview display that includes a time-multiplexed multiview backlight may provide a composite image that includes both 2D content and multiview or 3D content, such as further described in PCT Publication WO 2020/219400 (PCT/US2020/029017).

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen 12, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view.

A multiview image can be characterized, in part, by its angular resolution or number of views provided. The angular resolution of the multiview image can refer to the number of unique views 14 that are provided to a viewer, for example. Further, each of the views 14 of a multiview image can be characterized in part by its spatial resolution. The spatial resolution of a particular view can refer to a number or arrangement of pixels that make up each view. In an example, a particular multiview image can include respective views 14 having different spatial resolution characteristics. In some examples, the angular resolution of a multiview image can be weighted to provide different numbers of views 14 in different directions.

Figure 1B:
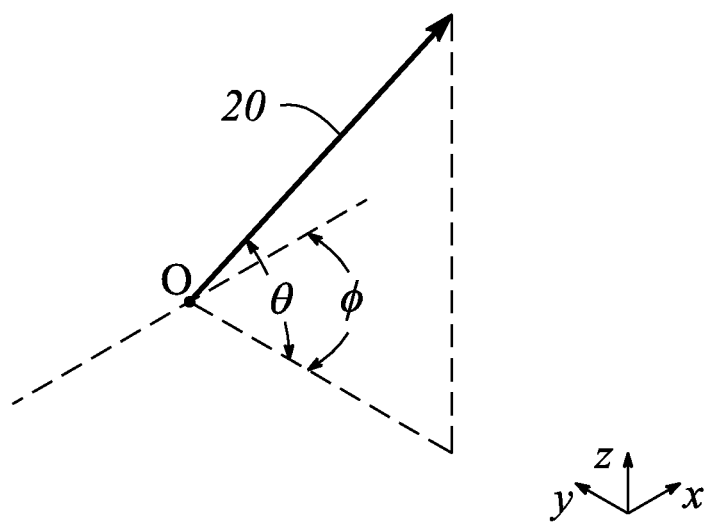
FIG. 1B illustrates a graphical representation of angular components of a light beam having a particular principal angular direction corresponding to a view direction of a multiview display in an example, according to an embodiment consistent with the principles described herein.

A view direction or equivalently a light beam having a direction corresponding to a view direction of a multiview display generally has a principal angular direction given by angular components $\{\theta, \varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\varphi$ is an angle in a horizontal plane (e.g., parallel to the multiview display screen plane). FIG. 1B illustrates a graphical representation of the angular components $\{\theta, \varphi\}$ of a light beam 20 having a particular principal angular direction corresponding to a view direction (e.g., one of the view directions 16 from the example of FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set (or group) of sub-pixels representing 'view' pixels in each view of a plurality of different views of a multiview display. In particular, a multiview pixel may have an individual sub-pixel corresponding to or representing a view pixel in each of the different views of the multiview image. Moreover, the sub-pixels of the multiview pixel are so-called 'directional pixels' in that each of the sub-pixels is associated with a predetermined view direction of a corresponding one of the different views. Further, according to various examples and embodiments, the different view pixels represented by the sub-pixels of a multiview pixel may have equivalent or at least substantially similar locations or coordinates in each of the different views. For example, a first multiview pixel may have individual sub-pixels corresponding to view pixels located at $\{x_1, y_1\}$ in each of the different views of a multiview image, while a second multiview pixel may have individual sub-pixels corresponding to view pixels located at $\{x_2, y_2\}$ in each of the different views, and so on. Further, by definition herein, a multiview pixel may be considered to be equivalent to or be represented by a set of light valves of an array of light valves, while a sub-pixel may be equivalent to or be represented by a light valve of the light valve array.

In some embodiments, a number of sub-pixels in a multiview pixel may be equal to a number of different views of the multiview display. For example, the multiview pixel may provide sixty-four (64) sub-pixels associated with a multiview display having (64) different views. In another example, the multiview display may provide an eight by four array of views (i.e., 32 views) and the multiview pixel may include thirty-two (32) sub-pixels (i.e., one for each view). Additionally, each different sub-pixel may have an associated direction (e.g., light beam principal angular direction) that corresponds to a different one of the view directions corresponding to the 64 different views, for example. Further, according to some embodiments, a number of multiview pixels of the multiview display may be substantially equal to a number of view pixels (i.e., pixels that make up a selected view) in the multiview display views.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore the plate light guide is a planar light guide. In other embodiments, the plate light guide may be curved in one or two orthogonal dimensions. For example, the plate light guide may be curved in a single dimension to form a cylindrical shaped plate light guide. However, any curvature with a radius of curvature sufficiently large to ensure that total internal reflection is maintained within the plate light guide to guide light can be used.

Herein, an 'angle-preserving scattering feature' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = \alpha \cdot \sigma$, where $\alpha$ is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread $\sigma$ (e.g., $\sigma_s \approx \sigma$). A uniform diffraction grating (i.e., a diffraction grating having a substantially uniform or constant diffractive feature spacing or grating pitch) is an example of an angle-preserving scattering feature.

Herein, a 'polarization-preserving scattering feature' or equivalently a 'polarization-preserving scatterer' is any feature or scatterer configured to scatter light in a manner that substantially preserves in scattered light a polarization or at least a degree of polarization of the light incident on the feature or scatterer. Accordingly, a 'polarization-preserving scattering feature' is any feature or scatterer where a degree of polarization of a light incident on the feature or scatterer is substantially equal to the degree of polarization of the scattered light. Further, by definition, 'polarization-preserving scattering' is scattering (e.g., of guided light) that preserves or substantially preserves a predetermined polarization of the light being scattered. The light being scattered may be polarized light provided by a polarized light source, for example.

Herein, the term 'unilateral' as in 'unilateral scattering element,' is defined as meaning 'one-sided' or 'preferentially in one direction' corresponding to a first side as opposed to another direction corresponding to a second side. In particular, a backlight configured to provide or emit light in a 'unilateral direction' is defined as a backlight that emits light from a first side and not from a second side opposite the first side. For example, the unilateral direction of emitted light provided by or scattered from a backlight light may correspond to light that is preferentially directed into a first (e.g., positive) half-space, but not into the corresponding second (e.g., negative) half-space. The first half-space may be above the backlight and the second half-space may be below the backlight. As such, the backlight may emit light into a region or toward a direction that is above the backlight and emit little or no light into another region or toward another direction that is below the backlight, for example. Similarly, a 'unilateral' directional scatterer such as, but not limited to, a unilateral scattering element is configured to scatter light toward and out of a first surface, but not a second surface opposite the first surface, by definition herein.

Herein, a 'diffraction grating' is broadly defined as a plurality of features (i.e., diffractive features) arranged to provide diffraction of light incident on the diffraction grating. In some examples, the plurality of features may be arranged in a periodic manner or a quasi-periodic manner. In other examples, the diffraction grating may be a mixed-period diffraction grating that includes a plurality of diffraction gratings, each diffraction grating of the plurality having a different periodic arrangement of features. Further, the diffraction grating may include a plurality of features (e.g., a plurality of grooves or ridges in a material surface) arranged in a one-dimensional (1D) array. Alternatively, the diffraction grating may comprise a two-dimensional (2D) array of features or an array of features that are defined in two dimensions. The diffraction grating may be a 2D array of bumps on or holes in a material surface, for example. In some examples, the diffraction grating may be substantially periodic in a first direction or dimension and substantially aperiodic (e.g., constant, random, etc.) in another direction across or along the diffraction grating. A pitch or spacing between diffractive features can be constant or variable. For example, spacing between features can be greater toward an edge of a light guide and proximal to a light source, and spacing between features can be less toward a central portion of the light guide and distal from the light source.

As such, and by definition herein, a diffraction grating is a structure that provides diffraction of light incident on the diffraction grating. If the light is incident on the diffraction grating from a light guide, the provided diffraction or diffractive scattering may result in, and thus be referred to as, 'diffractive coupling' or 'diffractive scattering' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in, and on a material surface (i.e., a boundary between two materials). The surface may be a surface of a light guide, for example. The diffractive features may include any of a variety of structures that diffract light including, but not limited to, one or more of grooves, ridges, holes and bumps, any of which can be provided at, in or on a material surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating). In other examples, a diffraction grating or another diffractive feature can be provided inside of, or between surfaces of, a material that comprises a light guide.

According to various examples described herein, a diffraction grating (e.g., a diffraction grating of a diffractive multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, and $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer (i.e., m=±1, ±2, . . . ). A diffraction angle $\theta_m$ of a light beam produced by the diffraction grating may be given by equation (1). First-order diffraction or more specifically a first-order diffraction angle $\theta_m$ is provided when the diffraction order m is equal to one (i.e., m=1).

Figure 2:
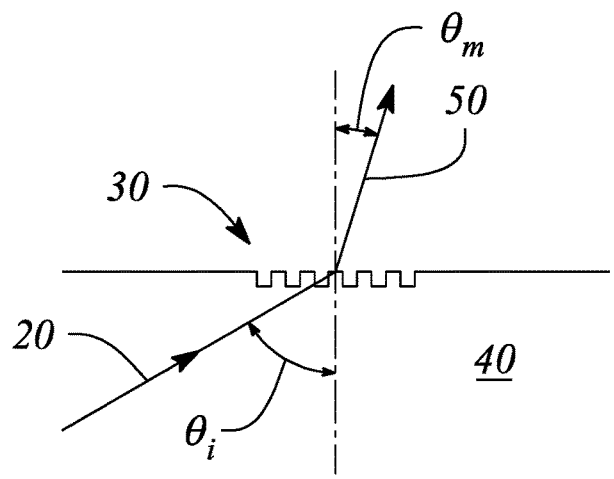
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 20 incident on the diffraction grating 30 at an incident angle $\theta_i$. The light beam 20 is a guided light beam within the light guide 40. Also illustrated in FIG. 2 is a coupled-out or scattered-out light beam 50 diffractively produced and coupled out by the diffraction grating 30 as a result of diffraction of the incident light beam 20. The coupled-out light beam 50 has a diffraction angle $\theta_m$ (or principal angular direction herein) as given by equation (1). The coupled-out light beam 50 may correspond to a diffraction order 'm' of the diffraction grating 30, for example.

Further, the diffractive features may be curved and may also have a predetermined orientation (e.g., a slant or a rotation) relative to a propagation direction of light, according to some embodiments. One or both of the curve of the diffractive features and the orientation of the diffractive features may be configured to control a direction of light coupled out by the diffraction grating, for example. For example, a principal angular direction of the coupled-out light may be a function of an angle of the diffractive feature at a point at which the light is incident on the diffraction grating relative to a propagation direction of the incident light.

By definition herein, a 'multibeam element' is a structure or element of a backlight or a display that provides light comprising a plurality of directional light beams. A 'diffractive' multibeam element is a multibeam element that produces the plurality of directional light beams by or using diffractive scattering, by definition. A 'reflective' multibeam element is a multibeam element that produces the plurality of directional light beams by or using reflection, by definition. A 'refractive' multibeam element is a multibeam element that produces the plurality of directional light beams by or using refraction or refractive scattering, by definition. In an example, a particular multibeam element may comprise one or more of reflective, refractive, and refractive features or elements configured to couple or scatter light out of a light guide as the directional light beams.

In some embodiments, a multibeam element may be optically coupled to a light guide of a backlight to provide the plurality of directional light beams by scattering or coupling out a portion of light guided in the light guide. Further, by definition herein, a multibeam element comprises scatterers configured to scatter light out of the light guide. According to various embodiments, the scatterers may include, but are not limited to, one or more of a diffraction grating configured to scatter out guided light using diffractive scattering, a micro-reflective element configured to scatter out guided light using reflective scattering, and a micro-refractive element configured to scatter out guided light using refractive scattering. In some embodiments, the multibeam element may comprise a plurality of scattering sub-elements (e.g., a plurality of one or more of diffraction gratings, micro-reflective sub-elements, and micro-refractive sub-elements) within a boundary of the multibeam element.

The directional light beams of the plurality of directional light beams produced by a multibeam element have different principal angular directions from one another, by definition herein. In particular, by definition, a directional light beam of the light beam plurality has a predetermined principal angular direction that is different from another light beam of the directional light beam plurality. In some embodiments, a reflector or reflective island may be provided to help guide and enhance light output from a multibeam element. The reflector can be configured to reflect light scattered by a multibeam element toward an emission surface of the light guide with which the multibeam element is coupled. In an embodiment that includes multibeam elements distributed about a light guide with spaces between the elements, reflectors can be provided as reflective islands that are correspondingly distributed about the light guide to reflect light from or through the multibeam elements.

According to various embodiments, the directional light beam plurality may represent a lightfield. For example, the directional light beam plurality may be confined to a substantially conical region of space or have a predetermined angular spread that includes the different principal angular directions of the light beams in the light beam plurality. As such, the predetermined angular spread of the directional light beams in combination (i.e., the light beam plurality) may represent the lightfield.

According to various embodiments, the different principal angular directions of the various light beams in the light beam plurality are determined by a characteristic including, but not limited to, a size (e.g., one or more of length, width, area, and etc.) of the multibeam element. In some embodiments, the multibeam element may be considered an extended point light source, i.e., a plurality of point light sources distributed across an extent of the multibeam element, by definition herein. Further, a light beam produced by the multibeam element has a principal angular direction given by angular components $\{\theta, \varphi\}$, by definition herein, and as described above with respect to FIG. 1B.

According to various embodiments, guided light or equivalently a guided 'light beam' produced by coupling light into the light guide may be a collimated light beam. Herein, a 'collimated light' or 'collimated light beam' is generally defined as a beam of light in which rays of the light beam are substantially parallel to one another within the light beam. Further, rays of light that diverge or are scattered from the collimated light beam are not considered to be part of the collimated light beam, by definition herein.

Herein, a 'collimation factor,' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., $+/-\sigma$ degrees about a central or principal angular direction of the collimated light beam). The light rays of the collimated light beam may have a Gaussian distribution in terms of angle and the angular spread may be an angle determined at one-half of a peak intensity of the collimated light beam, according to some examples.

Further herein, a 'collimator' is defined as substantially any optical device or apparatus that is configured to collimate light. For example, a collimator may include, but is not limited to, a collimating mirror or reflector, a collimating lens, a diffraction grating, a tapered light guide, and various combinations thereof. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape or similar collimating characteristic in one or both of two orthogonal directions that provides light collimation, according to some embodiments.

Herein, a 'light source is defined as a source of light (e.g., an optical emitter configured to produce and emit light). For example, the light source may comprise an optical emitter such as a light emitting diode (LED) that emits light when activated or turned on. In particular, herein, the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further by definition herein, the term 'broad-angle' as in 'broad-angle emitted light' is defined as light having a cone angle that is greater than a cone angle of the view of a multiview image or multiview display. In particular, in some embodiments, the broad-angle emitted light may have a cone angle that is greater than about sixty degrees (60°). In other embodiments, the broad-angle emitted light cone angle may be greater than about fifty degrees (50°), or greater than about forty degrees (40°). For example, the cone angle of the broad-angle emitted light may be about one hundred twenty degrees (100°). Alternatively, the broad-angle emitted light may have an angular range that is greater than plus and minus forty-five degrees (e.g., $>\pm 45°$) relative to the normal direction of a display. In other embodiments, the broad-angle emitted light angular range may be greater than plus and minus fifty degrees (e.g., >±50°), or greater than plus and minus sixty degrees (e.g., >±60°), or greater than plus and minus sixty-five degrees (e.g., >±65°). For example, the angular range of the broad-angle emitted light may be greater than about seventy degrees on either side of the normal direction of the display (e.g., >±70°). A 'broad-angle backlight' is a backlight configured to provide broad-angle emitted light, by definition herein.

In some embodiments, the broad-angle emitted light cone angle may defined to be about the same as a viewing angle of an LCD computer monitor, an LCD tablet, an LCD television, or a similar digital display device meant for broad-angle viewing (e.g., about ±40-65°). In other embodiments, broad-angle emitted light may also be characterized or described as diffuse light, substantially diffuse light, non-directional light (i.e., lacking any specific or defined directionality), or as light having a single or substantially uniform direction.

Further, as used herein, the article 'a' is intended to have its ordinary meaning in the patent arts, namely 'one or more'. For example, 'an element' means one or more elements and as such, 'the element' means 'the element(s)' herein. Also, any reference herein to 'top', 'bottom', 'upper', 'lower', 'up', 'down', 'front', 'back', 'first', 'second', 'left' or 'right', is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

According to some embodiments of the principles described herein, a time-multiplexed multiview backlight is provided. In some embodiments, the time-multiplexed multiview backlight is configured to provide enhanced spatial resolution using time-multiplexing. In other embodiments, the time-multiplexed multiview backlight is configured to provide enhanced angular resolution using time-multiplexing.

Figure 3A:
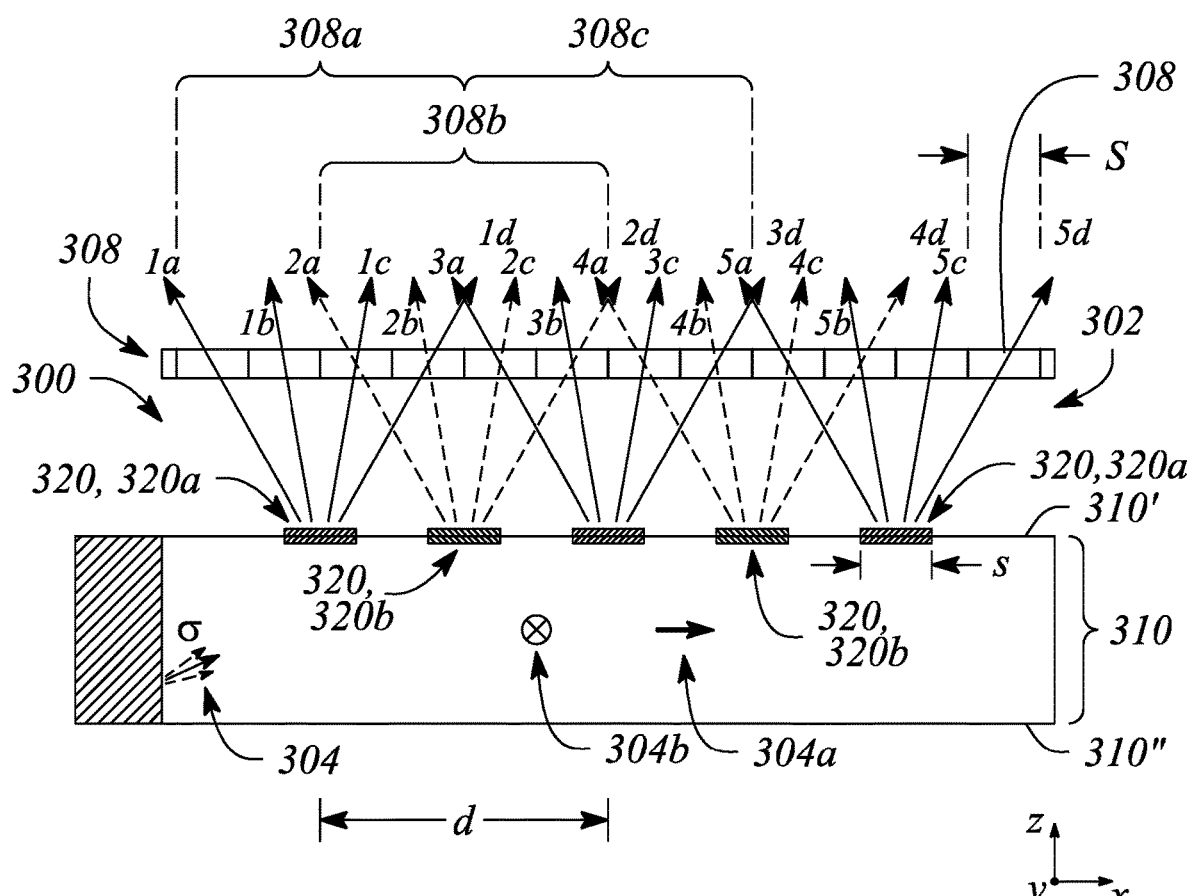
FIG. 3A illustrates a side view of a time-multiplexed multiview backlight in an example, according to an embodiment consistent with the principles described herein.
Figure 3B:
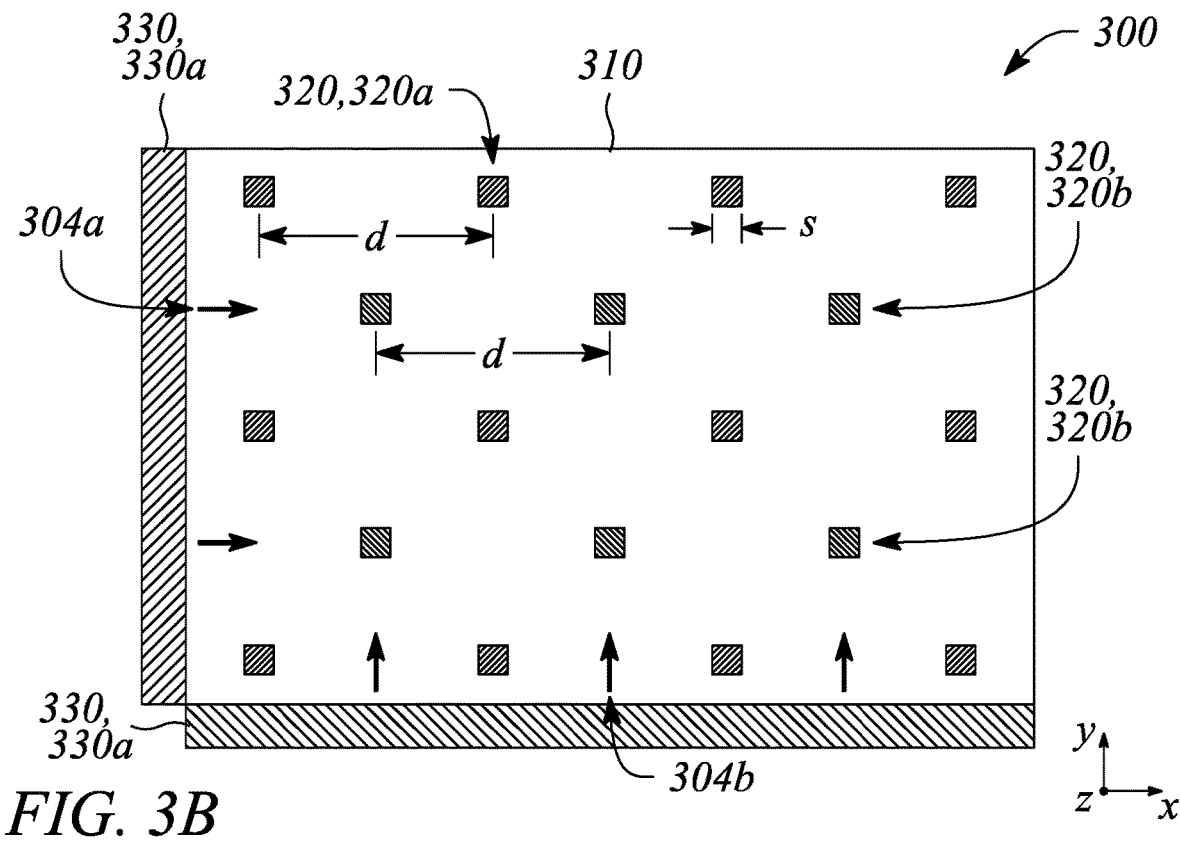
FIG. 3B illustrates a plan view a time-multiplexed multiview backlight in an example, according to an embodiment consistent with the principles described herein.
Figure 3C:
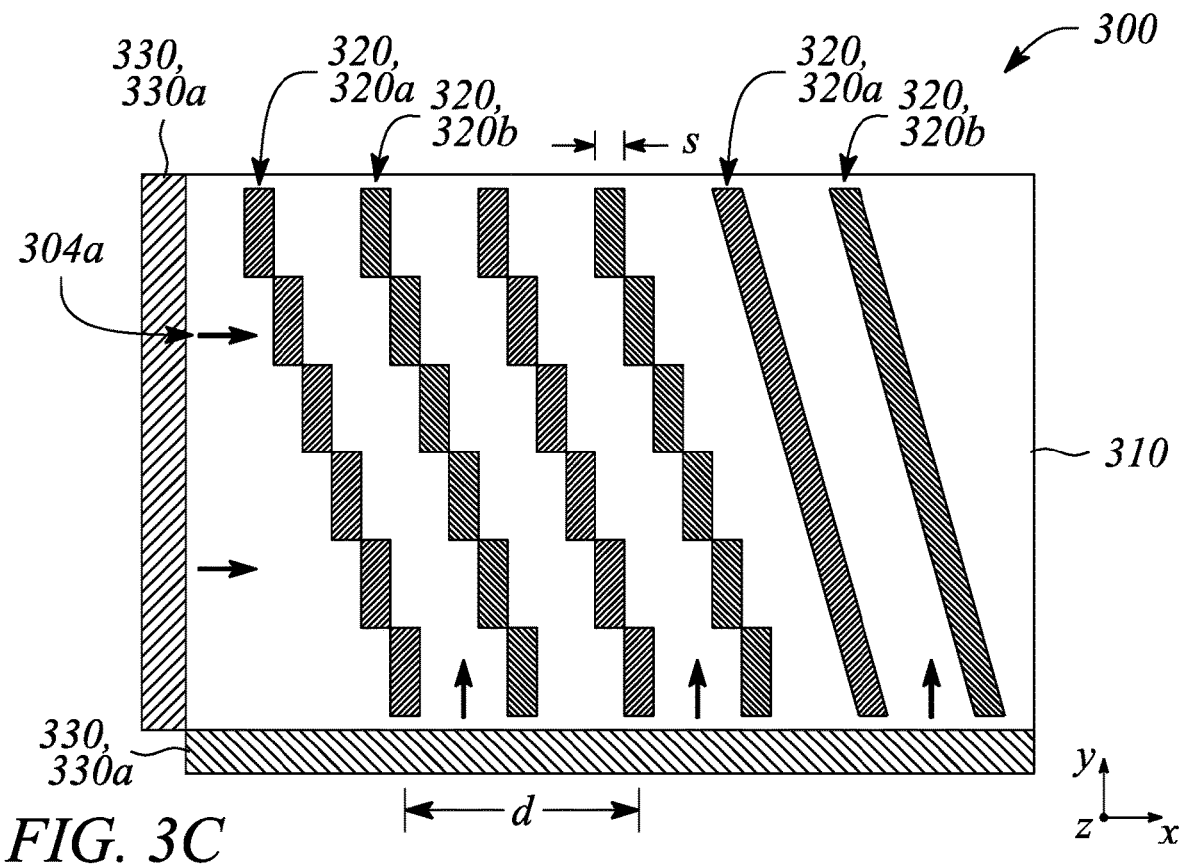
FIG. 3C illustrates a plan view a time-multiplexed multiview backlight in an example, according to another embodiment of consistent with the principles described herein.

FIG. 3A illustrates a side view of a time-multiplexed multiview backlight 300 in an example, according to an embodiment consistent with the principles described herein. FIG. 3B illustrates a plan view a time-multiplexed multiview backlight 300 in an example, according to an embodiment consistent with the principles described herein. FIG. 3C illustrates a plan view a time-multiplexed multiview backlight 300 in an example, according to another embodiment of consistent with the principles described herein. As illustrated in FIGS. 3A-3C, the time-multiplexed multiview backlight 300 may provide enhanced spatial resolution of emitted directional light beams, according to various embodiments. Further, the time-multiplexed multiview backlight 300 illustrated in FIG. 3B may be used in conjunction with a multiview display configured to provide both horizontal and vertical parallax, while the time-multiplexed multiview backlight 300 of FIG. 3C may be used in conjunction with a so-called horizontal-parallax-only (HPO) multiview display, for example.

The time-multiplexed multiview backlight 300 is configured to provide a plurality of directional light beams 302 having different principal angular directions from one another (e.g., as a light field). In particular, the provided plurality of directional light beams 302 are scattered or coupled out of and directed away from the time-multiplexed multiview backlight 300 in different principal angular directions corresponding to respective different view directions of a multiview display or multiview image, according to various embodiments. In some embodiments, the directional light beams 302 may be modulated (e.g., using light valves, as described below) to facilitate the display of information having three-dimensional (3D) content, e.g., in a multiview display that employs the time-multiplexed multiview backlight 300.

FIG. 3A further illustrates an array of light valves 308 by way of example and not limitation. The array of light valves 308 may be part of a multiview display that employs the time-multiplexed multiview backlight 300, for example. In various embodiments, different types of light valves may be employed as light valves 308 in the light valve array including, but not limited to, one or more of liquid crystal light valves, electrophoretic light valves, and light valves based on electrowetting. The array of light valves 308 is configured to modulate the directional light beams 302 to provide view pixels in various views of a multiview image. As with the directional light beams 302, according to various embodiments, the multiview image provided by modulating the directional light beams 302 may have enhanced spatial resolution as a result of coordination between the operation of the time-multiplexed multiview backlight 300 and the operation of light valve array.

As illustrated in FIGS. 3A-3C, the time-multiplexed multiview backlight 300 comprises a light guide 310 (e.g., a plate light guide). The light guide 310 is configured to guide light along an extent of the light guide 310 as guided light and more particularly as time-multiplexed guided light 304. According to various embodiments, time-multiplexed guided light 304 has a first direction 304a during a first time interval and a second direction 304b during a second time interval. In various embodiments, the light guide 310 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the time-multiplexed guided light 304 according to one or more guided modes of the light guide 310, for example.

In some embodiments, the light guide 310 may be a slab or plate optical waveguide (i.e., a plate light guide) comprising an extended, substantially planar sheet of optically transparent, dielectric material. The substantially planar sheet of dielectric material is configured to guide the time-multiplexed guided light 304 using total internal reflection. According to various examples, the optically transparent material of the light guide 310 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or acrylic glass, polycarbonate, etc.). In some examples, the light guide 310 may further include a cladding layer (not illustrated) on at least a portion of a surface (e.g., one or both of the top surface and the bottom surface) of the light guide 310. The cladding layer may be used to further facilitate total internal reflection, according to some examples.

Further, according to some embodiments, the light guide 310 is configured to guide the time-multiplexed guided light 304 according to total internal reflection at a non-zero propagation angle between a first surface 310' (e.g., 'front' or 'emission' surface or side) and a second surface 310" (e.g., 'back' or opposite surface or side) of the light guide 310. In particular, the time-multiplexed guided light 304 may propagate by reflecting or 'bouncing' between the first surface 310' and the second surface 310" of the light guide 310 at the non-zero propagation angle. As defined herein, a 'non-zero propagation angle' is an angle relative to a surface (e.g., the first surface 310' or the second surface 310") of the light guide 310. Further, the non-zero propagation angle is both greater than zero and less than a critical angle of total internal reflection within the light guide 310, according to various embodiments. According to some embodiments, a specific non-zero propagation angle may be chosen (e.g., arbitrarily) for a particular implementation as long as the specific non-zero propagation angle is chosen to be less than the critical angle of total internal reflection within the light guide 310.

The time-multiplexed multiview backlight 300 illustrated in FIGS. 3A-3C further comprises an array of multibeam elements 320. Multibeam elements 320 are configured to scatter the time-multiplexed guided light 304 out of the light guide 310 as the directional light beams 302 having different directions corresponding to different view directions of a multiview display. As illustrated, multibeam elements 320 of the multibeam element array are spaced apart from one another along a length of the light guide 310. In particular, the multibeam elements 320 of the multibeam element array are separated from one another by a finite space and represent individual, distinct elements (or groups of distinct elements or sub-elements) along the light guide length. That is, the multibeam elements 320 are spaced apart from one another according to a finite (i.e., non-zero) inter-element distance (e.g., a finite center-to-center distance). In some embodiments (e.g., as illustrated in FIGS. 3A-3C), the multibeam elements 320 generally do not intersect, overlap or otherwise touch one another. That is, each multibeam element 320 of the multibeam element array may be distinct and separated from other multibeam elements 320 of the array of multibeam elements 320, according to some embodiments.

According to various embodiments, different sets of multibeam elements 320 of the multibeam element array may be configured to be selectively responsive to respective portions of the time-multiplexed guided light 304 having different propagation directions within the light guide 310. In particular, a first set of multibeam elements 320a of the multibeam element array may be configured to selectively scatter the time-multiplexed guided light 304 having the first direction 304a to provide a directional light beams 302 during the first time interval. Further, the multibeam elements 320a of the first set may be substantially transparent or non-responsive to time-multiplexed light 304 propagating in other directions (e.g., second direction 304b) within the light guide 310. Similarly, a second set of multibeam elements 320b of the multibeam element array may be configured to selectively scatter the time-multiplexed guided light 304 having the second direction 304b to provide directional light beams 302 during the second time interval, while being substantially transparent or non-responsive to time-multiplexed light 304 propagating in other directions (e.g., first direction 304a) within the light guide 310. In FIG. 3A, the directional light beams 302 provided by the first set of multibeam elements 320a during the first time interval are illustrated using solid-line arrows and the directional light beams 302 provided by the second set of multibeam elements 320b during the second time interval are illustrated using dashed-line arrows.

According to various embodiments, multibeam elements 320 belonging to a particular set (e.g., either the first set or the second set of multibeam elements 320a, 320b) are spaced apart (e.g., in a first axial direction of the light guide 310) by a distance d. For example, multibeam elements 320, 320a belonging to the first set are illustrated as being spaced apart by the distance d. Similarly, while not illustrated, multibeam elements 320, 320b of the second set may also be spaced apart from one another by the distance d. In some embodiments, multibeam elements 320 having particular directional selectivity may be located between and alternate with multibeam elements 320 having a different directional selectivity. For example, FIGS. 3A-3C illustrate multibeam elements 320b of the second set that are interleaved or alternating with multibeam elements 320a of the first set. In some embodiments, multibeam elements 320, 320b of the second set may be about halfway between adjacent multibeam elements 320, 320a of the first set. In particular, a spacing between adjacent multibeam elements 320, 320a, 320b in both of the first and second sets may be about one half d (i.e., d/2).

Directional light beams 302 provided by respectively by the interleaved first and second sets of multibeam element 320a, 320b that have a common or corresponding direction are similarly interleaved with one another, as illustrated in FIG. 3A. However, the directional light beams 302 of the first set of directional light beams 302a are offset in a lateral direction with respect to the light valve array when compared to the directional light beams 302 of the second set of directional light beams 302. As a result, a combination of the first and second sets of directional light beams provides an enhanced resolution or number of directional light beams 302 in each view direction as a result of time multiplexing. In other words, when the time-multiplexed guided light 304 is sequentially alternated between the first direction 304a and the second direction 304b during respective first and second time intervals, two offset sets of directional light beams 302 may be provided by the time-multiplexed multiview backlight 300.

According to some embodiments, the time-multiplexed multiview backlight 300 may be used in a multiview display configured to provide view pixels of a multiview image. According to time-multiplexing, the first set of multibeam elements 320, 320a may be configured to provide the first set of directional light beams 302 corresponding to a first set of view pixels of the multiview image during the first time interval. Similarly, the second set of multibeam elements 320, 320b may be configured to provide view pixels of the same multiview image during the second time interval. Further, the view pixels provided during second time interval are interleaved or located between view pixels provide during the first time interval. The view pixels provided in this time-multiplexed manner may enhance a spatial resolution of or within the views in the multiview image, according to some embodiments. Stated another way, multibeam elements 320, 320b of the first set may emit directional light beams 302 to form a first set view pixels of the multiview image during the first time interval, while multibeam elements 320, 320b of the second set may emit directional light beams to form a second set of view pixels the same multiview image during the second time interval. The first set of view pixels may represent a first half of the view pixels of the multiview image and the second set of view pixels may represent second half of the view pixels of the multiview image in an alternating or checkerboard configuration, for example. Sequentially alternating between the first and second time intervals may provide a complete multiview image that includes all of the view pixels (i.e., the first half combined with the second half).

In some embodiments, time intervals corresponding to the first and second time intervals may be generally be less than about 50 milliseconds each (i.e., corresponding to about 20 Hz, or about 20 frames per second), or preferably less than about 17 milliseconds each (i.e., corresponding to about 60 Hz, or 60 frames per second per view direction), or other duration that depends on, e.g., a desired resolution of the display, data or processing bandwidth, or viewer preference. For example, a viewer of the multiview display may not perceive flicker or related image degradation when switching between the first and second time intervals exceeds about 60 Hz, as a result of visual integration within the human visual system. However, slower switching rates may still provide an acceptable viewing experience, in some embodiments.

As illustrated in FIG. 3A, different ones of the directional light beams 302 having different principal angular directions pass through and may be modulated by different light valves 308 in the light valve array. The modulated directional light beam 302 represents a view pixel of a view of the multiview image, according to various embodiments. Further, a particular light valve 308 of the array may correspond to a sub-pixel of a multiview pixel, and a set of multiple light valves 308 may correspond to a multiview pixel of the multiview display.

Further in FIG. 3A, the light valve array includes sets of light valves 308 that represent multiview pixels corresponding to the various multibeam elements 320 of the array of multibeam elements 320. For example, a first set of light valves 308a corresponds to a first multibeam element 320 of the first set of multibeam elements 320, 320a, a second set of light valves 308b corresponds to a second multibeam element 320, 320b of the second set, and a third set of light valves 308c corresponds to a third multibeam element 320 of the first set of multibeam elements 320, 320a, and so on alternating in a repeating manner. According to the embodiment of FIG. 3A, the first set of light valves 308a overlaps with the second set of light valves 308b such that at least one of the same light valves 308 or each set is configured to modulate a directional light beam 302 during each of the first and second time intervals. For example, a particular light valve 308 used to modulate a directional light beam 302 received from the first multibeam element 320 during the first time interval may be used to modulate another directional light beam 302 received from the second multibeam element 320 during the second time interval to provide two different view pixels the multiview image.

As is further illustrated in FIG. 3A, various modulated directional light beams (or equivalently view pixels of a multiview image) are designated using a numerical index (e.g., 1, 2, 3, 4) to indicate a particular origin or source multibeam element 320 along with an alphabetic character index (e.g., a, b, c, d) to indicate a particular view direction. For example, the modulated directional light beams corresponding to the first multibeam element 320 illustrated in FIG. 3A include modulated directional light beam 1a corresponding to a first view pixel in a first view direction, modulated directional light beam 1b corresponding to a first view pixel in a second view direction, modulated directional light beam 1c corresponding to a first view pixel in a third view direction, and modulated directional light beam 1d corresponding to a first view pixel in a fourth view direction.

In a similar manner, the modulated directional light beams corresponding to the second multibeam element 320 illustrated in FIG. 3A include a modulated directional light beam 2a corresponding to a second view pixel in the first view direction, modulated directional light beam 2b corresponding to a second view pixel in the second view direction, modulated directional light beam 2c corresponding to a second view pixel in a third view direction, and modulated directional light beam 2d corresponding to a second view pixel in a fourth view direction. Additionally, the modulated directional light beams 1a-1d are provided during the first time interval, while the modulated directional light beams 2a-2d are provided during the second time interval, as illustrated. FIG. 3A also illustrates modulated directional light beams from each of a third, fourth, and fifth multibeam elements 320, enumerated 3a, 3b, 3c, 3d, 4a, 4b, 4c, 4d; and 5a, 5b, 5c, 5d; respectively, where modulated directional light beams 3a-3d and 5a-5d are provided during the first time interval and modulated directional light beams 4a-4d are provide during the second time interval, as illustrated. Note that for illustrative purposes only four different modulated directional light beams in four different view directions are illustrated in FIG. 3A. However, additional or fewer modulated directional light beams and corresponding view pixels and view directions may be used, according to various embodiments.

Time-multiplexing of the time-multiplexed multiview backlight 300 along with coordinated operation of the light valve array may provide view pixels comprising first half and the second half of a multiview image, according to various embodiments. Moreover, the view pixels of the first half are interleaved or alternate with view pixels of the second half by virtue of the interleaved or alternating pattern of the multibeam elements 320, 320a of the first set and the multibeam elements 320, 320b of the second set. For example, FIG. 3A illustrates modulated directional light beams 1a, 3b, 5a, provided during the first time interval in a first view direction interleaved or alternating with modulated directional light beams 2a, 4a, provided during the second time interval in the first view direction. These modulated directional light beams represent view pixels in the first view direction or of a first view of a multiview pixel, where a first, third, and fifth view pixel is provided during the first time interval and a second and fourth view pixel is provided during the second time interval. As such, the spatial resolution of view pixels is enhanced by time-multiplexing as compared to the spatial resolution in either of the first or second time intervals alone. The multiview image, in turn, will have an enhanced spatial resolution as a result of time multiplexing the time-multiplexed multiview backlight 300, according to various embodiments.

FIG. 3B illustrates the array of multibeam elements 320, 320a, 320b of the first and second sets arranged in a rectangular, two-dimensional (2D) pattern across the light guide 310. As illustrated, multibeam elements 320b of the second set of multibeam elements 320b alternate with or are interleaved between the multibeam elements 320a of the first set. According to various embodiments, the multibeam element arrangement of FIG. 3B may be suitable for use in a multiview display that provides display parallax in two orthogonal directions, e.g., horizontal and vertical parallax.

FIG. 3C illustrates the array of multibeam elements 320, 320a, 320b of the first and second sets arranged in as a plurality of columns of multibeam elements 320 across the light guide 310. In particular, the columns are illustrated as slanted multibeam element columns. Further on a left side of FIG. 3C, slanted multibeam element columns comprising individual multibeam elements 320 oriented in a vertical direction along the column are illustrated. On a right side of FIG. 3C the slanted multibeam element columns are illustrated as substantially continuous, columnar multibeam elements 320. In some embodiments, these substantially continuous columnar multibeam elements 320 may be approximated by distributing individual multibeam elements 320 along the column and rotating the individual multibeam elements 320 to be in aligned with the column. The multibeam element arrangement of FIG. 3C may be suitable for use in a multiview display that provides a horizontal-parallax-only (HPO) multiview image. As used herein 'HPO' refers to and is defined as a multiview display that provides different views of a multiview image in different view directions and in a single plane (e.g., in a horizontal plane).

Figure 4A:
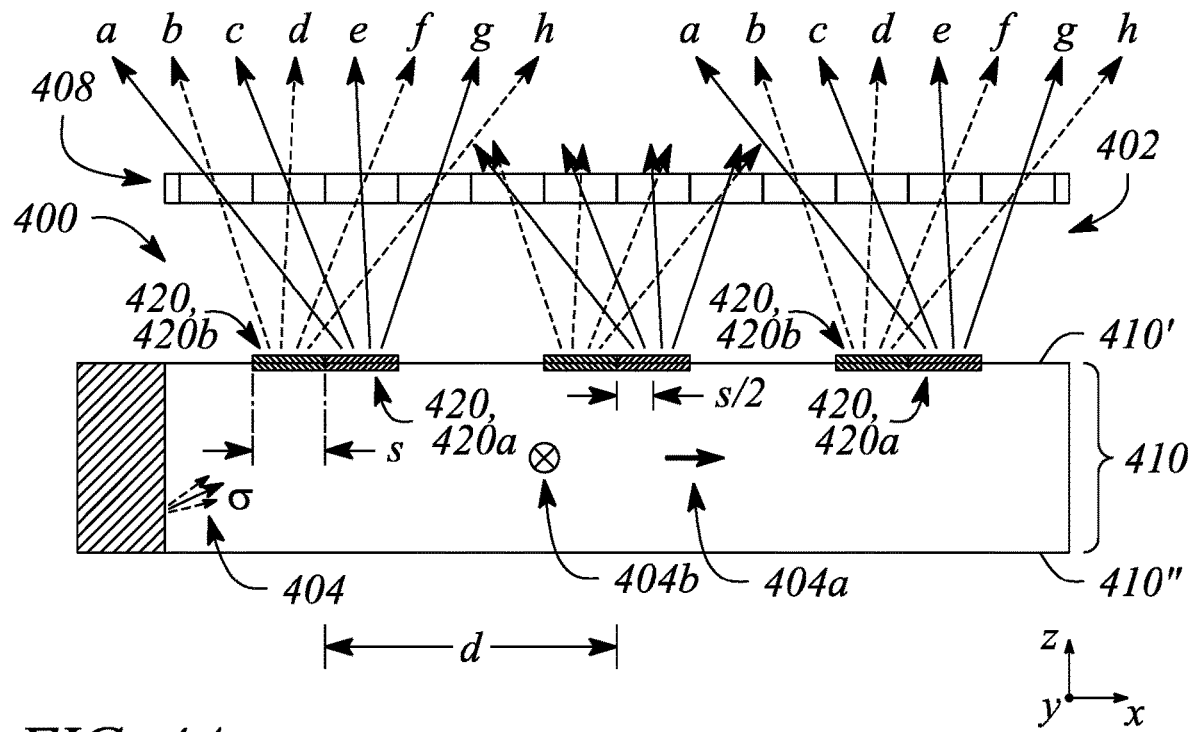
FIG. 4A illustrates a side view of a time-multiplexed multiview backlight in an example, according to an embodiment consistent with the principles described herein.
Figure 4B:
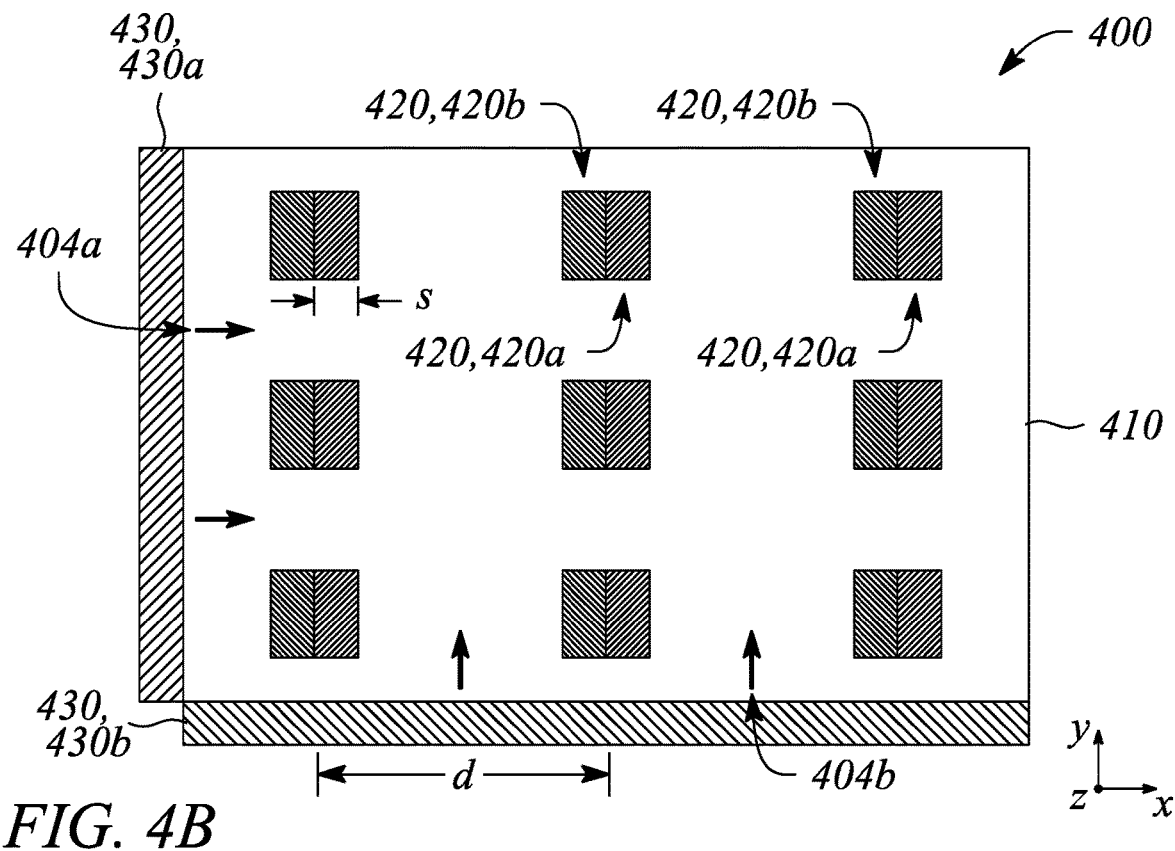
FIG. 4B illustrates a plan view a time-multiplexed multiview backlight in an example, according to an embodiment consistent with the principles described herein.
Figure 4C:
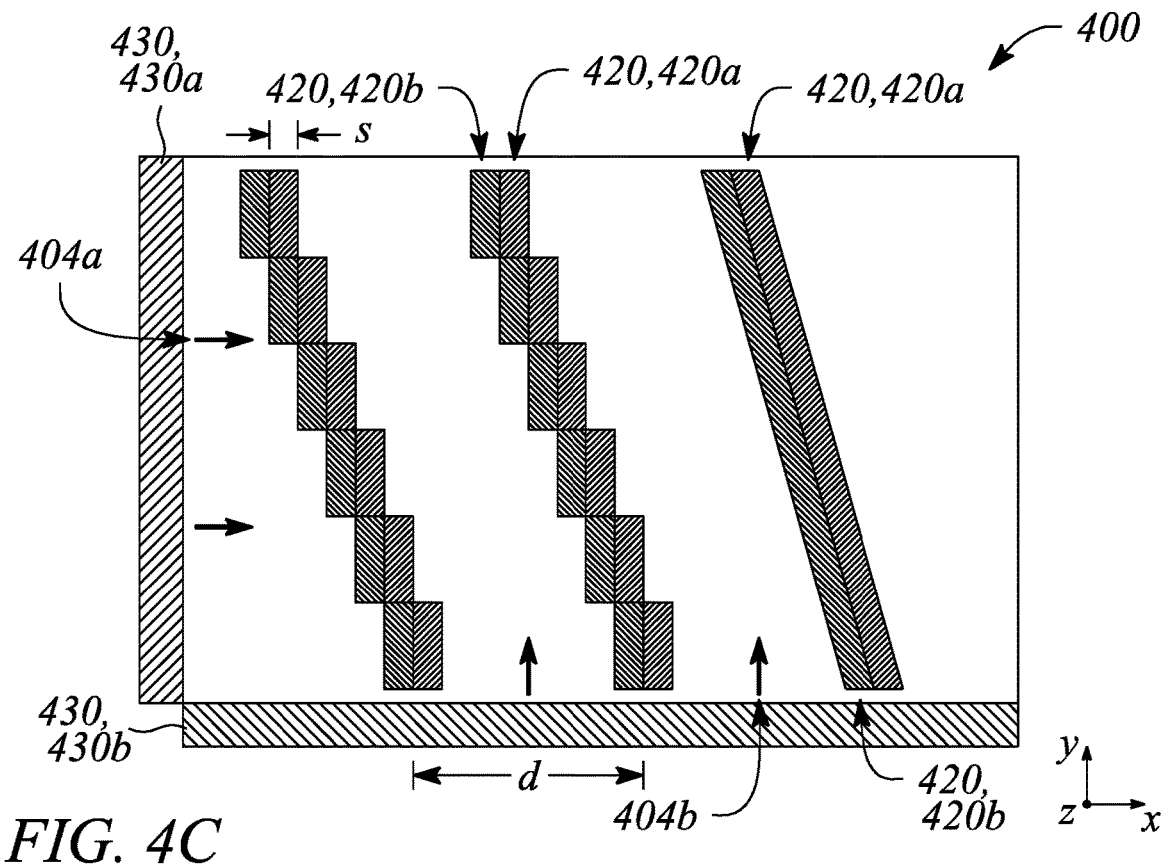
FIG. 4C illustrates a plan view a time-multiplexed multiview backlight in an example, according to another embodiment of consistent with the principles described herein.

FIG. 4A illustrates a side view of a time-multiplexed multiview backlight 400 in an example, according to an embodiment consistent with the principles described herein. FIG. 4B illustrates a plan view a time-multiplexed multiview backlight 400 in an example, according to an embodiment consistent with the principles described herein. FIG. 4C illustrates a plan view a time-multiplexed multiview backlight 400 in an example, according to another embodiment of consistent with the principles described herein. Further, the time-multiplexed multiview backlight 400 illustrated in FIG. 4B may be used in conjunction with a multiview display configured to provide both horizontal and vertical parallax, while the time-multiplexed multiview backlight 400 of FIG. 4C may be used in conjunction with a so-called horizontal-parallax-only (HPO) multiview display, for example.

The time-multiplexed multiview backlight 400 illustrated in FIGS. 4A-4C is configured to is configured to provide a plurality of directional light beams 402 having different principal angular directions from one another (e.g., as a light field). In some embodiments, the plurality of directional light beams 402 may be substantially similar to the plurality of directional light beams 302 described above with respect to the time-multiplexed multiview backlight 400. In particular, the provided plurality of directional light beams 402 are scattered or coupled out of and directed away from the time-multiplexed multiview backlight 400 in different principal angular directions corresponding to respective different view directions of a multiview display or multiview image, according to various embodiments. However, unlike the time-multiplexed multiview backlight 300 described above, the time-multiplexed multiview backlight 400 of FIGS. 4A-4C is configured to employ time-multiplexing to provide enhanced angular resolution of the view directions that may be supported. Further, in some embodiments, the directional light beams 402 may be modulated (e.g., using light valves, as described below) to facilitate the display of information having three-dimensional (3D) content, e.g., in a multiview display that employs the time-multiplexed multiview backlight 400.

FIG. 4A further illustrates an array of light valves 408 by way of example and not limitation. In some embodiments, the light valves 408 may be substantially similar to the light valves 308 of the above-described time-multiplexed multiview backlight 300. In particular, the array of light valves 408 is configured to modulate the directional light beams 402 to provide view pixels in various views of a multiview image. As with the directional light beams 402, the multiview image provided by modulating the directional light beams 402 may have enhanced angular resolution, according to various embodiments. In particular, enhanced angular resolution may be provided by time-multiplexing of the time-multiplexed multiview backlight 300 in coordination with the operation of light valve array, according to various embodiments.

As illustrated in FIGS. 4A-4C, the time-multiplexed multiview backlight 400 comprises a light guide 410. In various embodiments, the light guide 410 may be substantially similar to the light guide 310 of the time-multiplexed multiview backlight 300, described above. In particular, the light guide 410 is configured to guide light along an extent of the light guide 410 as guided light and more particularly as time-multiplexed guided light 404 having a first direction 404a during a first time interval and a second direction 404b during a second time interval. FIG. 4A also illustrates a first surface 410' (e.g., 'front' or 'emission' surface or side) and a second surface 410" (e.g., 'back' or opposite surface or side) of the light guide 410. The light guide 410 of the time-multiplexed multiview backlight 400 may be substantially similar to the light guide 310 of the above-described time-multiplexed multiview backlight 300, in some embodiments.

The time-multiplexed multiview backlight 300 illustrated in FIGS. 4A-4C further comprises an array of multibeam elements 420. Multibeam elements 420 are configured to scatter the time-multiplexed guided light 304 out of the light guide 410 as the directional light beams 402 having different directions corresponding to different view directions of a multiview display. In various respects, multibeam elements 420 of the multibeam element array may be substantially similar to the multibeam elements 320 of the time-multiplexed multiview backlight 300, described above. In particular, the multibeam elements 420 are configured to selectively scatter or couple time-multiplexed guided light 404 depending on a propagation direction of time-multiplexed guided light 404. Further, the multibeam elements 420 comprise a first set of multibeam elements 420a and a second set of multibeam elements 420b, the first set being configured to selectively scatter time-multiplexed guided light 404 propagating in the first direction 404a and the second set being configured to selectively scatter time-multiplexed guided light 404 propagating in the second direction 404b.

In a manner similar to the sets of multibeam elements 320a, 320b described above, the different sets of multibeam elements 420 of the multibeam element array illustrated in FIGS. 4A-4C may be configured to be selectively responsive to respective portions of the time-multiplexed guided light 404 having different propagation directions within the light guide 410. For example, as illustrated in FIG. 4A the first set of multibeam elements 420a of the multibeam element array is configured to selectively scatter the time-multiplexed guided light 404 having the first direction 404a to provide directional light beams 402 during the first time interval, while being substantially transparent or non-responsive to time-multiplexed light 404 propagating in other directions (e.g., second direction 404b) within the light guide 410. Similarly, a second set of multibeam elements 420b of the multibeam element array is configured to selectively scatter the time-multiplexed guided light 404 having the second direction 404b to provide directional light beams 402 during the second time interval, while being substantially transparent or non-responsive to time-multiplexed light 404 propagating in other directions (e.g., first direction 404a) within the light guide 410. Also, as in FIG. 3A, solid-line arrows are used to illustrate directional light beams 402 provided by the first set of multibeam elements 420a during the first time interval, while dashed-line arrows depict the directional light beams 402 provided by the second set of multibeam elements 420b during the second time interval.

However, in contrast to the sets of multibeam elements 320, 320a, 320b described above as being spaced apart from one another, the multibeam elements 420 of the second set of multibeam elements 420b are collocated with and have a lateral offset relative to multibeam elements 420 of the first set of multibeam elements 420a. In addition, an emanation point of a second set of directional light beams 402 scattered out by the second set of multibeam elements 420b is shifted by the lateral offset from an emanation point of a first set of directional light beams 402 scattered out by the first set of multibeam elements 420a, according to various embodiments. Herein, the 'emanation point' of a set of directional light beams 402 is defined as an apparent point in space from which the directional light beams 402 of the first or second set appear to originate. Alternatively, the 'emanation point' may be defined as a center or an effective center of a multibeam element 420 from which the set of directional light beams 402 is emitted.

In some embodiments, the lateral offset may be about one half of a size (e.g., a width in the lateral direction) of multibeam element 420. In some embodiments, the lateral offset may be an offset relative to a center of a combination of the multibeam elements 420 of the first and second sets of multibeam elements 420a, 420b. For example, as illustrated in FIG. 4A, the combination of multibeam elements 420, 420a, 420b has a sizes and is centered on a set of light valves 308a. Further in FIG. 4A, the lateral shift of a multibeam element 420 of the first set of multibeam elements 420a is to a left of the center of the multibeam element combination, while the lateral shift of a multibeam element 420 of the second set of multibeam elements 420b is to a right of the center. Also, the lateral shifts to either side of center are each about one half the size s of the multibeam elements 420 (s/2), as illustrated.

An effect of the lateral shift is to offset in angular space the directional light beams 402 provided by or emanating from the first set of multibeam elements 420a relative to the directional light beams 402 provided by or emanating from the second set of multibeam elements 420b. As a result, view directions associated with the directional light beams 402 of the second set of multibeam elements 420b may be interleaved with or are distributed between the directional light beams 402 of the first set of multibeam elements 420a. When the lateral shift is about one half the size of the multibeam elements 420, the view directions of the directional light beams 402 from the second set of multibeam elements 420b may be halfway between the view directions of the directional light beams 402 from the first set of multibeam elements 420b in an angular sense or space.

FIG. 4A illustrates various modulated directional light beams having view directions designated using an alphabetic character index (e.g., a, b, c, d, e, f, g, h) to indicate a particular view direction corresponding to each of the modulated directional light beams. For example, a modulated directional light beam a has a direction corresponding to a first view direction, a modulated directional light beam b has a direction corresponding to a second view direction, a modulated directional light beam c has a direction corresponding to a third view direction, a modulated directional light beam d has a direction corresponding to a fourth view direction, and so on, as illustrated in FIG. 4A.

According to time-multiplexing, the first set of multibeam elements 420, 420a may be configured to provide a first set of directional light beams 402 corresponding to a first set of views of the multiview image during the first time interval.

Similarly, the second set of multibeam elements 420, 420b may be configured to provide views of the same multiview image during the second time interval. Further, the views provided during second time interval are interleaved or located between view pixels provide during the first time interval. FIG. 4A illustrates modulated directional light beams b, d, f, h, provided by directional light beams 402 emanating from the second set of multibeam elements 402b during the second time interval distributed between or interleaved with modulated directional light beams a, c, e, f, provided by directional light beams 402 emanating from the first set of multibeam elements 402a. By time-multiplexing an output of the time-multiplexed multiview backlight 400, a complete set of modulated directional light beams (e.g., a, b, c, d, e, f, g, h) corresponding to a complete set of views may be provided. Moreover, an angular resolution of the time-multiplexed output is enhanced (e.g., twice as much) when compared to an angular resolution provided in either the first time interval or the second time interval.

As was the described above, time-multiplexing may involve switching between the first time interval and the second time interval in a sequential manner. The switching rate may be generally between about 20 Hz and about 60 Hz, in various embodiments. In some embodiments, switching rates of greater than 60 Hz may be employed. For example, a viewer may not perceive flicker or related image degradation from one view to the next in a multiview image when switching rate is or exceeds about 60 Hz, as a result of visual integration within the human visual system. However, slower switching rates may still provide an acceptable viewing experience, in some embodiments.

FIG. 4B illustrates the light guide 410 and the multibeam element array of the time-multiplexed multiview backlight 400. As illustrated, the multibeam element array includes the first set of multibeam elements 420a collocated with the second set of multibeam elements 420b. In addition, the collocated first and second sets of multibeam element 420a, 420b are arranged in a two-dimensional (2D) array that may be suitable for providing a multiview image having 2D parallax.

FIG. 4C also illustrates the light guide 410 and the multibeam element array of the time-multiplexed multiview backlight 400. However, in FIG. 4C the multibeam elements 420 are arranged in columns of either discrete multibeam elements 420 or comprising continuous columnar multibeam elements 420. As illustrated, the multibeam element array includes the first set of multibeam elements 420a collocated with the second set of multibeam elements 420b within each column. FIG. 4C also illustrates slanted multibeam element columns comprising individual multibeam elements 420 oriented in a vertical direction along the column on a left side, while on a right side of FIG. 4C the slanted multibeam element columns are illustrated as substantially continuous, columnar multibeam elements 420. As was discussed above with respect to FIG. 3C, the multibeam element arrangement of FIG. 4C may be suitable for use in a multiview display that provides a horizontal-parallax-only (HPO) multiview image, for example.

In some embodiments of the time-multiplexed multiview backlight 400, collocation of a multibeam element 420a of the first set and a multibeam element 420b of the second set within the multibeam element array may be provided using a side-by-side arrangement of the multibeam elements 420a, 420b. For example, FIGS. 4A-4C illustrate the side-by-side arrangement of the multibeam elements 420a, 420b in the multibeam element array. In other embodiments (not illustrated), collocation may be provided by overlapping a portion of a multibeam element 420*a* of the first set with a portion of the multibeam element 420*b* of the second set. In yet other embodiments (not illustrated), the multibeam elements 420*a*, 420*b* of the first and second sets may be blended with one another along a boundary or otherwise combined to provide collocation.

According to various embodiments, a size of a multibeam element 320, 420 of the multibeam element array is comparable to a size of a light valve of an array of light valves, or equivalently to a size of a sub-pixel of a multiview pixel. Herein, the 'size' may be defined in any of a variety of manners to include, but not be limited to, a length, a width or an area. For example, the size of each of the light valve may be a length thereof and the comparable size of each of the multibeam elements 320, 420 may be a length thereof. In another example, the size may refer to an area such that an area of a multibeam element 320, 420 may be comparable to an area of a light valve or a sub-pixel.

In some embodiments, the size of a particular multibeam element 320, 420 of the multibeam element array is between about twenty-five percent (25%) and about two hundred percent (200%) of the light valve size. For example, if the multibeam element size is denoted 's' and the light valve size is denoted 'S' (e.g., as illustrated in FIGS. 3A, 4A), then the multibeam element size s may be given by equation (2) as $$\frac{1}{2}S \le s \le 2S \quad (2)$$

In other examples, a multibeam element size is in a range that is greater than about fifty percent (50%) of the light valve size, or greater than about sixty percent (60%) of the light valve size, or greater than about seventy percent (70%)) of the light valve size, or greater than about eighty percent (80%) of the light valve size, or greater than about ninety percent (90%) of the light valve size, and that is less than about one hundred eighty percent (180%) of the light valve size, or less than about one hundred sixty percent (160%) of the light valve size, or less than about one hundred forty (140%)) of the light valve size, or less than about one hundred twenty percent (120%) of the light valve size. For example, by 'comparable size', the multibeam element size may be between about seventy-five percent (75%) and about one hundred fifty (150%) of the light valve size. According to some embodiments, the comparable sizes of the multibeam element and the light valve may be chosen to reduce, or in some examples to minimize, dark zones between views of the multiview display. Moreover, the comparable sizes of the multibeam element and the light valve may be chosen to reduce, and in some examples to minimize, an overlap between views (or view pixels) of the multiview display.

According to various embodiments, the time-multiplexed multiview backlight 300, 400 may further comprise a plurality of light sources 330, 430. The light sources 330, 430 may be configured to provide the time-multiplexed guided light 304, 404 having the different propagation directions 304*a*, 304*b*, 404*a*, 404*b*. FIGS. 3A-3C illustrate a first light source 330*a* adjacent to a first edge of the light guide 310. FIGS. 3B and 3C further illustrate a second light source 330*b* adjacent to a second edge of the light guide 310. FIGS. 4A-4C illustrate a first light source 430*a* adjacent to a first edge of the light guide 410. FIGS. 4B and 4C further illustrate a second light source 430*b* adjacent to a second edge of the light guide 410. As illustrated, the first light source 330*a*, 430*a* is configured to provide the time-multiplexed guided light 304, 404 having the first direction 304*a*, 404*a* during the first time interval, while the second light source 330*b*, 430*b* is configured to provide the time-multiplexed guided light 304, 404 having the second direction 304*b*, 404*b* during the second time interval. Time-multiplexing of the time-multiplexed multiview backlight 300, 400 may be provided by activating (turning on) and deactivating (turning off) the first and second light sources 330*a*, 430*a*, 330*b*, 430*b* in a sequential manner. That is, the first light source 330*a*, 430*a* may be activated and the second light source 330*b*, 430*b* deactivated during the first time interval. Then, during the second time interval, the second light source 330*b*, 430*b* may be activated, while the first light source 330*a*, 430*a* is deactivated. Time-multiplexing may be provided by a sequential arrangement of the first and second time intervals, as described above.

In various embodiments, the light sources 330, 430 including the first light sources 330*a*, 430*a* and the second light sources 330*b*, 430*b* may comprise substantially any source of light (e.g., optical emitter) including, but not limited to, a light emitting diode (LED), a laser (e.g., laser diode) or a combination thereof. In some embodiments, the light sources 330, 430 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the one or more of the light sources 330 may be a substantially broadband light source configured to provide substantially broadband or polychromatic light. For example, the first and second light sources 330*a*, 430*a*, 330*b*, 430*b* may be configured to provide white light. In some embodiments, the light sources 330, 430 may comprise a plurality of different optical emitters configured to provide different colors of light.

In some embodiments, the light sources 330, 430 may further comprise a collimator (not illustrated). The collimator may be configured to receive substantially uncollimated light from one or more of the optical emitters of, e.g., the first or the second light sources 330*a*, 430*a*, 330*b*, 430*b* and to then convert the substantially uncollimated light into collimated light. In particular, the collimator may provide collimated light having the non-zero propagation angle and being collimated according to a predetermined collimation factor σ, according to some embodiments. Accordingly, the time-multiplexed guided light 304, 404 produced by coupling light into the light guide 310, 410 from the light sources 330, 430 may be a collimated light beam, according to various embodiments.

As described above, the first light source 330*a*, 430*a* may provide light as the time-multiplexed guided light 304, 404 propagating in the first direction 304*a*, 404*a* and the second light source 330*a*, 430*b* may provide light as the time-multiplexed guided light 304, 404 propagating in the second direction 304*b*, 404*b*. The first and second directions 304*a*, 404*a*, 304*b*, 404*b* may be orthogonal or substantially orthogonal, in some embodiments (e.g., illustrated in FIGS. 3B, 3C, 4B, and 4C). Other, non-parallel and non-orthogonal relationships between the first and second directions 304*a*, 404*a*, 304*b* 404*b* may be used, such as when the light guide 310, 410 has a shape other than a rectangle.

According to various embodiments, a multibeam element 320, 420 of the multibeam element array in the time-multiplexed multiview backlight 300, 400 may comprise one or more of a diffraction grating configured to diffractively scatter out the time-multiplexed guided light 304, 404, a micro-reflective element configured to reflectively scatter out the time-multiplexed guided light 304, 404, and a micro-refractive element configured to refractively scatter out the time-multiplexed guided light 304, 404. In some embodiments, a multibeam element 320, 420 of the multibeam element array may comprise a reflective island configured to reflect light scattered by the multibeam element 320, 420 toward an emission surface of the light guide 310, 410. In some embodiments, a multibeam element 320, 420 of the multibeam element array may comprises a plurality of scattering sub-elements, each scattering sub-element being configured to separately scatter out a portion of the time-multiplexed guided light 304, 404.

In some embodiments, multibeam element 320, 420 of the multibeam element array may be located at or adjacent to an emission surface of the light guide 310, 410 of the time-multiplexed multiview backlight 300, 400. For example, FIGS. 3A and 4A illustrate multibeam elements 320, 420 disposed at an emission surface (e.g., the first surface 310', 410') of the light guide 310, 410. In other embodiments (not illustrated), the multibeam element 320, 420 may be located at or adjacent to a surface of the light guide 310, 410 that is opposite to the emission surface (e.g., the second surface 310", 410"). In yet other embodiments (not illustrated), the multibeam element 320, 420 may be located within the light guide 310, 410 between the surfaces thereof.

In some embodiments, the time-multiplexed multiview backlight 300, 400 may further comprise a broad-angle backlight adjacent to the light guide 310, 410 the time-multiplexed multiview backlight 300, 400. In these embodiments, the broad-angle backlight may be configured to provide broad-angle emitted light during a two-dimensional (2D) mode, while the time-multiplexed multiview backlight 300, 400 is configured to provide the directional light beams 302, 402 during a multiview mode.

Figure 5:
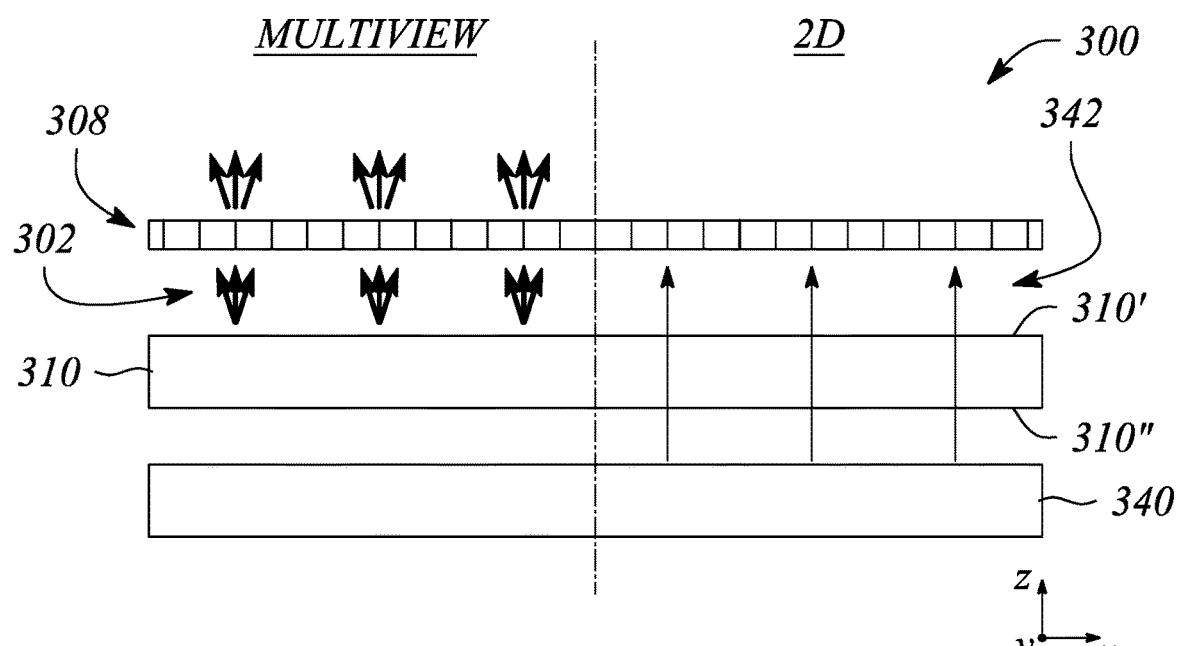
FIG. 5 illustrates a side view of a time-multiplexed multiview backlight including a broad-angle backlight in an example, according to an embodiment consistent with the principles described herein.

FIG. 5 illustrates a side view of a time-multiplexed multiview backlight 300 including a broad-angle backlight in an example, according to an embodiment consistent with the principles described herein. In particular, FIG. 5 illustrates a broad-angle backlight 340 adjacent to a second surface 310" of the light guide 310 opposite to an emission surface (e.g., first surface 310') from which the directional light beams 302 are emitted. FIG. 5 further illustrates an array of light valves 308 adjacent to the emission surface of the light guide 310. Note that while FIG. 5 illustrates the time-multiplexed multiview backlight 300, the time-multiplexed multiview backlight 400 may also include a broad-angle backlight in a similar arrangement, according to some embodiments.

As illustrated on a left side of FIG. 5, directional light beams 302 supporting display of a time-multiplexed multiview image may be provided using the time-multiplexed multiview backlight 300 during a multiview mode (MULTIVIEW). Alternatively, as illustrated on a right side of FIG. 5, a two-dimensional (2D) mode supporting display of a 2D image may be provided by activating the broad-angle backlight 340 to provide broad-angle emitted light 342 to the array of light valves 308. The multibeam elements 320 and the light sources 330 are omitted from FIG. 5 for ease of illustration and not by way of limitation.

Figure 6:
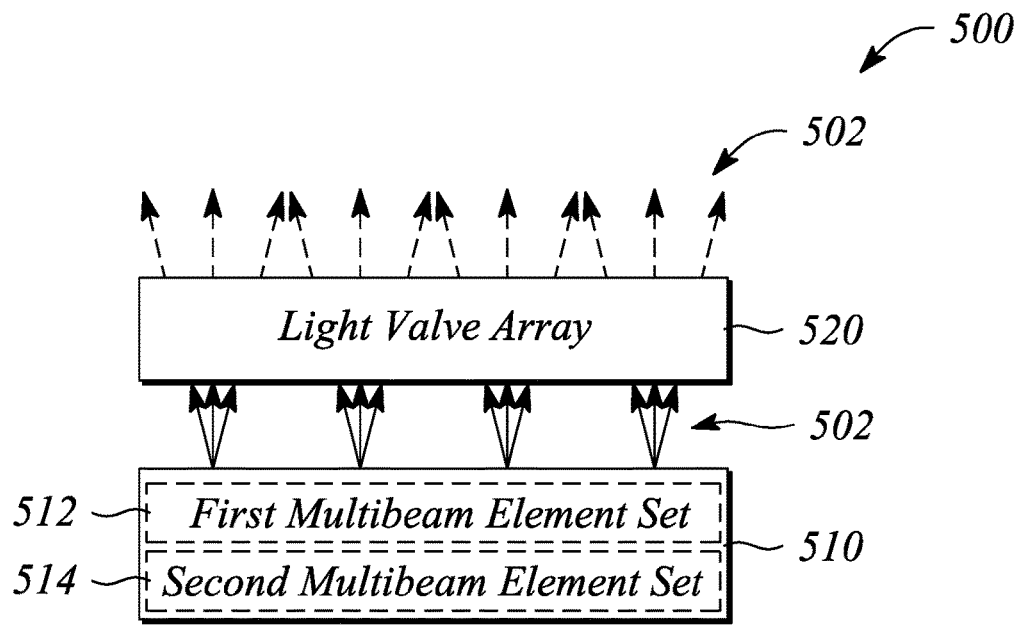
FIG. 6 illustrates a block diagram of a time-multiplexed multiview display in an example, according to an embodiment of the principles described herein.

In accordance with some embodiments of the principles described herein, a multiview display is provided. FIG. 6 illustrates a block diagram of a time-multiplexed multiview display 500 in an example, according to an embodiment of the principles described herein. As illustrated, the time-multiplexed multiview display 500 comprises a time-multiplexed multiview backlight 510 comprising a light guide and an array of multibeam elements. According to various embodiments, multibeam elements of the multibeam element array are configured to scatter out time-multiplexed guided light from the light guide as directional light beams 502 having directions corresponding to different view directions of the time-multiplexed multiview display 500. According to some embodiments, the time-multiplexed multiview backlight 510 may be substantially similar to either the time-multiplexed multiview backlight 300 or the time-multiplexed multiview backlight 400, described above. In particular, the time-multiplexed multiview backlight 510 comprises a first set of the multibeam elements 512 is configured to selectively scatter the time-multiplexed guided light having a first direction and a second set of the multibeam elements 514 is configured to selectively scatter out the time-multiplexed guided light having a second direction.

The time-multiplexed multiview display 500 illustrated in FIG. 6 further comprises an array of light valves 520. The array of light valves 520 is configured to modulate the directional light beams 502 as view pixels of a multiview image having different views in the different view directions. According to some embodiments, time-multiplexing may provide either enhanced spatial resolution or enhanced angular resolution of the multiview image.

In particular, in some embodiments of the time-multiplexed multiview display 500, multibeam elements of the second set of the multibeam elements 514 are located between and alternate with multibeam elements of the first set of the multibeam elements 512. In these embodiments, view pixels provided during a second time interval when the time-multiplexed guided light has the second direction are interspersed between view pixels provided during a first time interval when the time-multiplexed guided light has the first direction. As a result, time-multiplexing of the time-multiplexed multiview display 500 may provide enhanced spatial resolution of view pixels within the multiview image when compared to a multiview display that does not employ the time-multiplexing described herein. For example, the time-multiplexed multiview display 500 may be configured to provide a first portion of the multiview image (e.g., a first half of the total view pixels) using view pixels provided during the first time interval and a second portion of the multiview image (e.g., a second half of the total view pixels interleaved with the first half) using view pixels provided during the second time interval. Thus, sequential time-multiplexing of the first and second portions of the multiview image may be configured to provide a multiview image having twice a spatial resolution of either one of the first portion or the second portion, according to some embodiments.

In other embodiments, multibeam elements of the second set of the multibeam elements 514 may be collocated with and have a lateral offset relative to multibeam elements of the first set of the multibeam elements 512. In these embodiments, views of the multiview image during a second time interval when the time-multiplexed guided light has the second direction may be interleaved with views of the multiview image during a first time interval when the time-multiplexed guided light has the first direction. As a result, time-multiplexing of the time-multiplexed multiview display 500 may provide enhanced angular resolution of the multiview image when compared to a multiview display that does not employ the time-multiplexing described herein. For example, the time-multiplexed multiview display 500 may be configured to provide a first portion of the multiview image using view pixels provided during the first time interval and a second portion of the multiview image using view pixels provided during the second time interval. That is the first portion comprises a first set of views of the multiview image and the second portion comprises a second set of views of the multiview image such that the first and second set combine according to time-multiplexing to provide the full multiview image. Thus, sequential time-multiplexing of the first and second portions of the multiview image may be configured to provide a multiview image having twice an angular resolution of either one of the first portion or the second portion, according to some embodiments.

In some embodiments, a size of multibeam elements of the multibeam element array is between twenty-five and two hundred percent of a size of a light valve in the array of light valves of the time-multiplexed multiview display 500. In some embodiments, a multibeam element of the array of multibeam elements comprises one or more of a diffraction grating configured to diffractively scatter out the time-multiplexed guided light, a micro-reflective element configured to reflectively scatter out the time-multiplexed guided light, and a micro-refractive element configured to refractively scatter out the time-multiplexed guided light.

Figure 7:
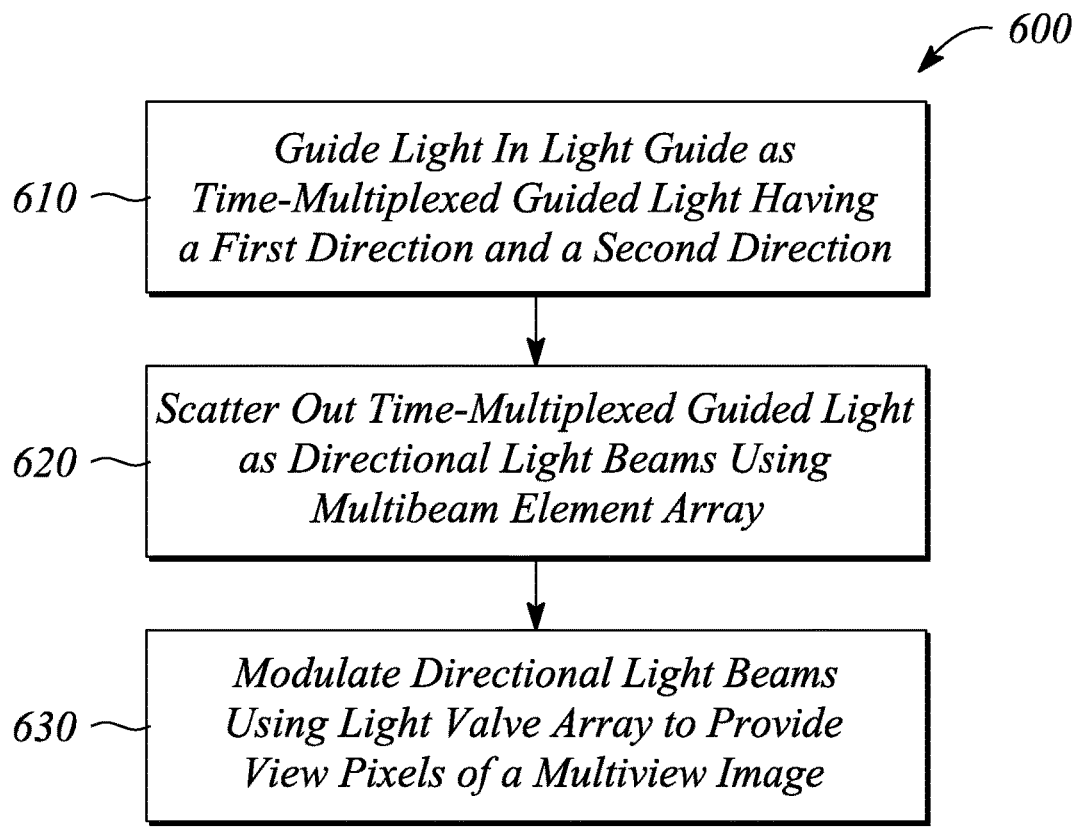
FIG. 7 illustrates a flow chart of a method of time-multiplexed multiview backlight operation in an example, according to an embodiment consistent with the principles described herein.

In accordance with other embodiments of the principles described herein, a method of time-multiplexed multiview backlight operation is provided. FIG. 7 illustrates a flow chart of a method 600 of time-multiplexed multiview backlight operation in an example, according to an embodiment consistent with the principles described herein.

As illustrated in FIG. 7, the method 600 of time-multiplexed multiview backlight operation comprises guiding 610 light in a light guide as time-multiplexed guided light having a first direction during a first time interval and a second direction during a second time interval. In some embodiments, the light guide and time-multiplexed guided light may be substantially similar respectively to the light guide 310, 410 and the time-multiplexed guided light 304, 404, described above with respect to the time-multiplexed multiview backlight 300, 400. For example, the first direction of the time multiplexed guided light may be different from or even substantially orthogonal to the second direction, in some embodiments. Further, the time-multiplexed guided light may be collimated according to a predetermined collimation factor, according to some embodiments.

The method 600 of time-multiplexed multiview backlight operation illustrate in FIG. 7 further comprises scattering out 620 the time-multiplexed guided light as directional light beams using an array of multibeam elements. According to various embodiments, the directional light beams having different directions corresponding to different view directions of a multiview display. In some embodiments, the array of multibeam elements may be substantially similar to the array of multibeam elements 320, 420 of the above-described time-multiplexed multiview backlight 300, 400. In particular, a first set of multibeam elements of the array of multibeam elements may selectively scatter out 620 the time-multiplexed guided light during the first time interval and a second set of multibeam elements of the multibeam element array may selectively scatter out 620 the time-multiplexed guided light during the second time interval.

In some embodiments, multibeam elements of the second set of multibeam elements are located between and alternate with multibeam elements of the first set of multibeam elements. In these embodiments, directional light beams selectively scattered out 620 by the second set of multibeam elements during the second time interval may be located between corresponding directional light beams selectively scattered out 620 by the first set of multibeam elements during the first time interval. In other embodiments, multibeam elements of the second set of the multibeam elements are collocated with and have a lateral offset relative to multibeam elements of the first set of the multibeam elements. In these embodiments, directional light beams scattered out by the first and second sets of the multibeam elements have directions corresponding to different sets of view directions of the multiview display during the first time interval and the second time interval. In particular, sets of view directions during the second time interval may be interleaved with sets of view directions during the first time interval, according to some embodiments.

In FIG. 7, the method 600 of time-multiplexed multiview backlight operation further comprises modulating 630 the directional light beams using an array of light valves to provide view pixels of a multiview image having different views in the different view directions. In some embodiments, the array of light valves may be substantially similar to the array of light valves 308, 408 described above with respect to the time-multiplexed multiview backlight 300, 400. In particular, modulating the directional light beams using the array of light valves may enhance one or both of a spatial resolution and an angular resolution of the multiview image, as is described above with respect to the time-multiplexed multiview display 500.

Thus, there have been described examples and embodiments of a time-multiplexed multiview backlight, a time-multiplexed multiview display, and a method of time-multiplexed multiview backlight operation that may provide one or both of enhanced spatial resolution and enhanced angular resolution using time-multiplexing. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A time-multiplexed multiview backlight comprising:
a light guide configured to guide light as time-multiplexed guided light having a first direction during a first time interval and a second direction during a second time interval;
an array of multibeam elements configured to scatter out the time-multiplexed guided light as directional light beams having different directions corresponding to different view directions of a multiview display; and
an array of light valves configured to modulate the directional light beams to provide view pixels of a multiview image having different views in the different view directions, wherein the array of light valves is arranged in sets of light valves representing multiview pixels corresponding to multibeam elements of the array of multibeam elements, a first set of light valves corresponding to a multibeam element of the first set of multibeam elements and a second set of light valves corresponding to a multibeam element of the second set of multibeam elements, and wherein the first set of light valves overlaps the second set of light valves;
wherein a first set of multibeam elements of the multibeam element array is configured to selectively scatter out the time-multiplexed guided light having the first direction and a second set of multibeam elements of the multibeam element array is configured to selectively scatter out the time-multiplexed guided light having the second direction.

2. The time-multiplexed multiview backlight of claim 1, wherein multibeam elements of the second set of multibeam elements are located between and alternate with multibeam elements of the first set of multibeam elements, and a second set of directional light beams scattered out by the second set of multibeam elements during the second time interval are located between corresponding directional light beams of a first set of directional light beams scattered out by the first set of multibeam elements during the first time interval.

3. The time-multiplexed multiview backlight of claim 1, wherein multibeam elements of the second set of multibeam elements are collocated with and have a lateral offset relative to multibeam elements of the first set of multibeam elements, and an emanation point of a second set of directional light beams scattered out by the second set of multibeam elements is shifted by the lateral offset from an emanation point of a first set of directional light beams scattered out by the first set of multibeam elements.

4. The time-multiplexed multiview backlight of claim 1, wherein a size of multibeam elements of the multibeam element array is between twenty-five and two hundred percent of a size of a light valve in an array of light valves of the multiview display.

5. The time-multiplexed multiview backlight of claim 1, wherein the time-multiplexed guided light having one or both of the first direction and the second direction is collimated according to a collimation factor.

6. The time-multiplexed multiview backlight of claim 1, wherein a multibeam element of the array of multibeam elements comprises one or more of a diffraction grating configured to diffractively scatter out the time-multiplexed guided light, a micro-reflective element configured to reflectively scatter out the time-multiplexed guided light, and a micro-refractive element configured to refractively scatter out the time-multiplexed guided light.

7. The time-multiplexed multiview backlight of claim 1, wherein a multibeam element of the array of multibeam elements comprises a reflective island configured to reflect light scattered out by the multibeam element toward an emission surface of the light guide.

8. The time-multiplexed multiview backlight of claim 1, further comprising a broad-angle backlight adjacent to the light guide of the time-multiplexed multiview backlight, the broad-angle backlight being configured to provide broad-angle emitted light during a two-dimensional (2D) mode and the time-multiplexed multiview backlight being configured to provide the directional light beams during a multiview mode.

9. A time-multiplexed multiview display comprising:
a time-multiplexed multiview backlight comprising a light guide and an array of multibeam elements, multibeam elements of the multibeam element array being configured to scatter out time-multiplexed guided light from the light guide as directional light beams having directions corresponding to different view directions of the time-multiplexed multiview display; and
an array of light valves configured to modulate the directional light beams as view pixels of a multiview image having different views in the different view directions,
wherein a first set of the multibeam elements is configured to selectively scatter out the time-multiplexed guided light having a first direction and a second set of the multibeam elements is configured to selectively scatter out the time-multiplexed guided light having a second direction, and
wherein the array of light valves is arranged in sets of light valves representing multiview pixels corresponding to multibeam elements of the array of multibeam elements, a first set of light valves corresponding to a multibeam element of the first set of multibeam elements and a second set of light valves corresponding to a multibeam element of the second set of multibeam elements, and wherein the first set of light valves overlaps the second set of light valves.

10. The time-multiplexed multiview display of claim 9, wherein multibeam elements of the second set of the multibeam elements are located between and alternate with multibeam elements of the first set of the multibeam elements, and wherein view pixels provided during a second time interval when the time-multiplexed guided light has the second direction are interspersed between view pixels provided during a first time interval when the time-multiplexed guided light has the first direction.

11. The time-multiplexed multiview display of claim 10, wherein the time-multiplexed multiview display is configured to provide a first portion of the multiview image using view pixels provided during the first time interval and a second portion of the multiview image using view pixels provided during the second time interval, and sequential time-multiplexing of the first and second portions of the multiview image is configured to provide a multiview image having twice a spatial resolution of either one of the first portion or the second portion.

12. The time-multiplexed multiview display of claim 9, wherein multibeam elements of the second set of the multibeam elements are collocated with and have a lateral offset relative to multibeam elements of the first set of the multibeam elements, and wherein views of the multiview image during a second time interval when the time-multiplexed guided light has the second direction are interleaved with views of the multiview image during a first time interval when the time-multiplexed guided light has the first direction.

13. The time-multiplexed multiview display of claim 12, wherein the time-multiplexed multiview display is configured to provide a first portion of the multiview image using view pixels provided during the first time interval and a second portion of the multiview image using view pixels provided during the second time interval, and sequential time-multiplexing of the first and second portions of the multiview image is configured to provide a multiview image having twice an angular resolution of either one of the first portion or the second portion.

14. The time-multiplexed multiview display of claim 9, wherein a size of multibeam elements of the multibeam element array is between twenty-five and two hundred percent of a size of a light valve in the array of light valves of the time-multiplexed multiview display, and wherein a multibeam element of the array of multibeam elements comprises one or more of a diffraction grating configured to diffractively scatter out the time-multiplexed guided light, a micro-reflective element configured to reflectively scatter out the time-multiplexed guided light, and a micro-refractive element configured to refractively scatter out the time-multiplexed guided light.

15. A method of time-multiplexed multiview backlight operation, the method comprising:
guiding light in a light guide as time-multiplexed guided light having a first direction during a first time interval and a second direction during a second time interval;
scattering out the time-multiplexed guided light as directional light beams using an array of multibeam elements, the directional light beams having different directions corresponding to different view directions of a multiview display; and modulating the directional light beams using an array of light valves to provide view pixels of a multiview image having different views in the different view directions, wherein modulating the directional light beams using the array of light valves enhances one or both of a spatial resolution and an angular resolution of the multiview image, wherein a first set of multibeam elements of the array of multibeam elements selectively scatters out the time-multiplexed guided light during the first time interval and a second set of multibeam elements of the multibeam element array selectively scatters out the time-multiplexed guided light during the second time interval; and wherein the array of light valves is arranged in sets of light valves representing multiview pixels corresponding to multibeam elements of the array of multibeam elements, a first set of light valves corresponding to a multibeam element of the first set of multibeam elements and a second set of light valves corresponding to a multibeam element of the second set of multibeam elements, and wherein the first set of light valves overlaps the second set of light valves.

16. The method of time-multiplexed multiview backlight operation of claim 15, wherein multibeam elements of the second set of multibeam elements are located between and alternate with multibeam elements of the first set of multibeam elements, and directional light beams selectively scattered out by the second set of multibeam elements during the second time interval are located between corresponding directional light beams selectively scattered out by the first set of multibeam elements during the first time interval.

17. The method of time-multiplexed multiview backlight operation of claim 15, wherein multibeam elements of the second set of the multibeam elements are collocated with and have a lateral offset relative to multibeam elements of the first set of the multibeam elements, directional light beams scattered out by the first and second sets of the multibeam elements having directions corresponding to different sets of view directions of the multiview display during the first time interval and the second time interval, and wherein sets of view directions during the second time interval are interleaved with sets of view directions during the first time interval.

* * * * *